(12) United States Patent
Yagi et al.

(10) Patent No.: US 11,150,519 B2
(45) Date of Patent: Oct. 19, 2021

(54) LIQUID CRYSTAL DISPLAY DEVICE

(71) Applicant: SHARP KABUSHIKI KAISHA, Sakai (JP)

(72) Inventors: Toshifumi Yagi, Sakai (JP); Meng-Yi Hung, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 91 days.

(21) Appl. No.: 16/345,457

(22) PCT Filed: Oct. 19, 2017

(86) PCT No.: PCT/JP2017/037878
§ 371 (c)(1),
(2) Date: Apr. 26, 2019

(87) PCT Pub. No.: WO2018/079411
PCT Pub. Date: May 3, 2018

(65) Prior Publication Data
US 2019/0250466 A1    Aug. 15, 2019

(30) Foreign Application Priority Data

Oct. 28, 2016  (JP) .............................. JP2016-211533

(51) Int. Cl.
*G02F 1/1337*    (2006.01)
*G02F 1/1333*    (2006.01)
(Continued)

(52) U.S. Cl.
CPC ........ *G02F 1/133753* (2013.01); *G02F 1/137* (2013.01); *G02F 1/1337* (2013.01);
(Continued)

(58) Field of Classification Search
CPC ......... G02F 1/133707; G02F 1/133753; G02F 1/133757; G02F 1/134345
See application file for complete search history.

(56) References Cited

U.S. PATENT DOCUMENTS 6,724,452 B1     4/2004  Takeda et al.
2009/0284703 A1* 11/2009  Shoraku ............ G02F 1/133753
                                                    349/129
(Continued)

FOREIGN PATENT DOCUMENTS

CN      102395921 A      3/2012
CN      104199224 A     12/2014
(Continued)

*Primary Examiner* — Jessica M Merlin
(74) *Attorney, Agent, or Firm* — ScienBiziP, P.C.

(57) ABSTRACT

A liquid crystal display device includes first and second substrates and a vertically-aligned liquid crystal layer. The first substrate includes a pixel electrode and a first alignment film. The second substrate includes a counter electrode and a second alignment film. The first alignment film has, within each pixel, first and second pretilt regions that define first and second pretilt directions, respectively, that are antiparallel to each other. The second alignment film has, within each pixel, third and fourth pretilt regions that define third and fourth pretilt directions, respectively, that are antiparallel to each other. At least either a surface of the first substrate or a surface of the second substrate has a groove formed so as to overlap at least either a boundary between the first and second pretilt regions or a boundary between the third and fourth pretilt regions when seen from a direction normal to a display surface.

17 Claims, 30 Drawing Sheets

(51) Int. Cl.
  *G02F 1/1335* (2006.01)
  *G02F 1/1343* (2006.01)
  *G02F 1/137* (2006.01)
  *G02F 1/1368* (2006.01)

(52) U.S. Cl.
  CPC .. G02F 1/133345 (2013.01); G02F 1/133514 (2013.01); G02F 1/133707 (2013.01); G02F 1/134309 (2013.01); G02F 1/1368 (2013.01); *G02F 1/13712* (2021.01); *G02F 1/133519* (2021.01); *G02F 1/133742* (2021.01); *G02F 1/133757* (2021.01); *G02F 1/133761* (2021.01); *G02F 1/134345* (2021.01); *G02F 2201/121* (2013.01); *G02F 2201/123* (2013.01)

(56) References Cited

U.S. PATENT DOCUMENTS

| | | | |
|---|---|---|---|
| 2009/0290114 A1* | 11/2009 | Na | G02F 1/133707 349/139 |
| 2012/0033158 A1 | 2/2012 | Nakanishi et al. | |
| 2012/0138922 A1 | 6/2012 | Yamazaki et al. | |
| 2013/0229611 A1* | 9/2013 | Yoon | G02F 1/133707 349/142 |
| 2015/0055065 A1* | 2/2015 | Shin | G02F 1/133753 349/106 |
| 2016/0282680 A1 | 9/2016 | Hao | |
| 2018/0314114 A1 | 11/2018 | Shimoshikiryoh et al. | |

FOREIGN PATENT DOCUMENTS

| | | | |
|---|---|---|---|
| JP | H11-242225 A | 9/1999 | |
| JP | 2007-264037 A | 10/2007 | |
| JP | 2012-134475 A | 7/2012 | |
| JP | 5184618 B2 | 4/2013 | |
| JP | 5203601 B2 | 6/2013 | |
| WO | WO-2009087802 A1 * | 7/2009 | ....... G02F 1/133707 |
| WO | 2017/073496 A1 | 5/2017 | |

* cited by examiner

ACTIVE MATRIX SUBSTRATE SIDE (a)

COUNTER SUBSTRATE SIDE (b)

LIQUID CRYSTAL LAYER (c)

WHITE DISPLAY: EXAMPLE 1 (WITH GROOVE)

(a)

WHITE DISPLAY: COMPARATIVE EXAMPLE (WITHOUT GROOVE)

(b)

WHITE DISPLAY: EXAMPLE 1 (WITH GROOVE)

(a)

WHITE DISPLAY: COMPARATIVE EXAMPLE (WITHOUT GROOVE)

(b)

HALFTONE DISPLAY: EXAMPLE 1 (WITH GROOVE)

(a)

HALFTONE DISPLAY: COMPARATIVE EXAMPLE (WITHOUT GROOVE)

(b)

BLACK DISPLAY: EXAMPLE 1 (WITH GROOVE)

(a)

BLACK DISPLAY: COMPARATIVE EXAMPLE (WITHOUT GROOVE)

(b)

WHITE DISPLAY: EXAMPLE 1 (WITH GROOVE)

(a)

WHITE DISPLAY: COMPARATIVE EXAMPLE (WITHOUT GROOVE)

(b)

(a)

(b)

(a)

(b)

(c)

WHITE DISPLAY: EXAMPLE 1 (WITH GROOVE ON ONE SIDE)

(a)

WHITE DISPLAY: EXAMPLE 2 (WITH GROOVES ON BOTH SIDES)

(b)

(a) ACTIVE MATRIX SUBSTRATE SIDE (b) COUNTER SUBSTRATE SIDE (c) LIQUID CRYSTAL LAYER (a) ACTIVE MATRIX SUBSTRATE SIDE (b) COUNTER SUBSTRATE SIDE (c) LIQUID CRYSTAL LAYER (a) ACTIVE MATRIX SUBSTRATE SIDE (b) COUNTER SUBSTRATE SIDE (a) ACTIVE MATRIX SUBSTRATE SIDE (b) COUNTER SUBSTRATE SIDE (c) LIQUID CRYSTAL LAYER

LIQUID CRYSTAL DISPLAY DEVICE

TECHNICAL FIELD

The present invention relates to liquid crystal display devices and, in particular, to a liquid crystal display device, including a vertically-aligned liquid crystal layer, in which a pretilt direction of liquid crystal molecules is defined by an alignment film.

BACKGROUND ART

With improved display characteristics, liquid crystal display devices are more and more widely used in television receivers and the like. Despite improved viewing angle characteristics of liquid crystal display devices, further improvement is needed. In particular, there is a strong demand for improvement in viewing angle characteristics of liquid crystal display devices including vertically-aligned liquid crystal layers (such liquid crystal display devices being also called "VA mode liquid crystal display devices").

Currently, for improvement in viewing angle characteristics, VA mode liquid crystal display devices being used as large-sized display devices in televisions and the like employ an aligned multi-domain structure in which a plurality of liquid crystal domains are formed in each pixel. A mainstream scheme for forming an aligned multi-domain structure is an MVA mode. The MVA mode is disclosed, for example, in PTL 1.

In the MVA mode, a pair of substrates opposed to each other with a vertically-aligned liquid crystal layer sandwiched therebetween are each provided with alignment-regulating structures facing the liquid crystal layer, whereby a plurality of liquid crystal domains differing in alignment direction (tilt direction) from one another are formed within each pixel (typically with four types of alignment direction). As the alignment-regulating structures, slits (openings) or ribs (projecting structures) provided in or on electrodes are used to exert alignment-regulating forces from both sides of the liquid crystal layer.

However, unlike in a case where a pretilt direction is defined by an alignment film as in the case of a conventional TN mode, using slits or ribs exerts uneven alignment-regulating forces on liquid crystal molecules within the pixel, as the slits or the ribs have linear shapes. This undesirably produces a distribution of response speed within the pixel.

In order to avoid this problem, it is preferable that a VA mode liquid crystal display device too have an aligned multi-domain structure formed by defining a pretilt direction with an alignment film. PTL 2 discloses a liquid crystal display device having an aligned multi-domain structure so formed.

CITATION LIST

Patent Literature

PTL 1: Japanese Unexamined Patent Application Publication No. 11-242225
PTL 2: Japanese Patent No. 5203601

SUMMARY OF INVENTION

Technical Problem

However, in the VA mode liquid crystal display device having an aligned multi-domain structure formed by defining a pretilt direction with an alignment film, as described in PTL 2, a dark line (a region that is darker than other regions) that is parallel to an edge of a pixel electrode appears in the vicinity of the edge. Further, a dark line appears also at a boundary between adjacent liquid crystal domains. These dark lines cause a decrease in transmittance (decrease in efficiency in the use of light).

The present invention is one made in view of the foregoing problem, and it is an object of the present invention to reduce the area of a dark line that appears within a pixel of a VA mode liquid crystal display device having an alignment multi-domain structure formed by defining a pretilt direction with an alignment film.

Solution to Problem

A liquid crystal display device according to an embodiment of the present invention is a liquid crystal display device including: an arrangement of a first substrate and a second substrate that are opposed to each other; a vertically-aligned liquid crystal layer provided between the first substrate and the second substrate; and a plurality of pixels arranged in a matrix, wherein the first substrate includes a pixel electrode provided in each of the plurality of pixels and a first alignment film provided between the pixel electrode and the liquid crystal layer, the second substrate includes a counter electrode opposed to the pixel electrode and a second alignment film provided between the counter electrode and the liquid crystal layer, the first alignment film has, within each of the plurality of pixels, a first pretilt region that defines a first pretilt direction and a second pretilt region that defines a second pretilt direction that is antiparallel to the first pretilt direction, the second alignment film has, within each of the plurality of pixels, a third pretilt region that defines a third pretilt direction that is substantially orthogonal to the first pretilt direction and the second pretilt direction and a fourth pretilt region that defines a fourth pretilt direction that is antiparallel to the third pretilt direction, and at least either a surface of the first substrate that faces the liquid crystal layer or a surface of the second substrate that faces the liquid crystal layer has a groove formed so as to overlap at least either a boundary between the first pretilt region and the second pretilt region or a boundary between the third pretilt region and the fourth pretilt region when seen from a direction normal to a display surface.

In an embodiment, at least the surface of the first substrate has the groove.

In an embodiment, the first substrate further includes an organic insulating layer formed under the pixel electrode, and the organic insulating layer has a depressed portion that defines the groove in the surface of the first substrate.

In an embodiment, the groove in the surface of the first substrate is formed so as to overlap both the boundary between the first pretilt region and the second pretilt region and the boundary between the third pretilt region and the fourth pretilt region when seen from the direction normal to the display surface.

In an embodiment, at least the surface of the second substrate has the groove.

In an embodiment, the second substrate further includes a color filter layer and a planarizing layer covering the color filter layer, the counter electrode is provided over the planarizing layer, and the planarizing layer has a depressed portion that defines the groove in the surface of the second substrate.

In an embodiment, the groove in the surface of the second substrate is formed so as to overlap both the boundary between the first pretilt region and the second pretilt region and the boundary between the third pretilt region and the fourth pretilt region when seen from the direction normal to the display surface.

In an embodiment, the surface of the first substrate and the surface of the second substrate each have the groove.

In an embodiment, the first substrate further includes an organic insulating layer formed under the pixel electrode, and the organic insulating layer has a depressed portion that defines the groove in the surface of the first substrate, the second substrate further includes a color filter layer and a planarizing layer covering the color filter layer, the counter electrode is provided over the planarizing layer, and the planarizing layer has a depressed portion that defines the groove in the surface of the second substrate.

In an embodiment, the groove in the surface of the first substrate is formed so as to overlap both the boundary between the first pretilt region and the second pretilt region and the boundary between the third pretilt region and the fourth pretilt region when seen from the direction normal to the display surface, and the groove in the surface of the second substrate is formed so as to overlap both the boundary between the first pretilt region and the second pretilt region and the boundary between the third pretilt region and the fourth pretilt region when seen from the direction normal to the display surface.

In an embodiment, the groove in the surface of the first substrate is formed so as to overlap the boundary between the first pretilt region and the second pretilt region when seen from the direction normal to the display surface, and the groove in the surface of the second substrate is formed so as to overlap the boundary between the third pretilt region and the fourth pretilt region when seen from the direction normal to the display surface.

In an embodiment, each of the plurality of pixels has a first liquid crystal domain in which a tilt direction of liquid crystal molecules near a center of the liquid crystal layer in in-plane and thickness directions in presence of a voltage applied between the pixel electrode and the counter electrode is a predetermined first direction, a second liquid crystal domain in which a tilt direction of liquid crystal molecules near the center of the liquid crystal layer in the in-plane and thickness directions in the presence of a voltage applied between the pixel electrode and the counter electrode is a second direction, a third liquid crystal domain in which a tilt direction of liquid crystal molecules near the center of the liquid crystal layer in the in-plane and thickness directions in the presence of a voltage applied between the pixel electrode and the counter electrode is a third direction, and a fourth liquid crystal domain in which a tilt direction of liquid crystal molecules near the center of the liquid crystal layer in the in-plane and thickness directions in the presence of a voltage applied between the pixel electrode and the counter electrode is a fourth direction, and the first direction, the second direction, the third direction, and the fourth direction are four directions any two of which have a difference therebetween that is substantially equal to an integral multiple of 90 degrees.

In an embodiment, the first liquid crystal domain is located close to at least a part of an edge of the pixel electrode, the at least a part including a first edge portion in which an azimuth direction orthogonal to the first edge portion toward an inside of the pixel electrode forms an angle of greater than 90 degrees with the first direction, the second liquid crystal domain is located close to at least a part of an edge of the pixel electrode, the at least a part including a second edge portion in which an azimuth direction orthogonal to the second edge portion toward the inside of the pixel electrode forms an angle of greater than 90 degrees with the second direction, the third liquid crystal domain is located close to at least a part of an edge of the pixel electrode, the at least a part including a third edge portion in which an azimuth direction orthogonal to the third edge portion toward the inside of the pixel electrode forms an angle of greater than 90 degrees with the third direction, the fourth liquid crystal domain is located close to at least a part of an edge of the pixel electrode, the at least a part including a fourth edge portion in which an azimuth direction orthogonal to the fourth edge portion toward the inside of the pixel electrode forms an angle of greater than 90 degrees with the fourth direction, and at least either the surface of the first substrate or the surface of the second substrate has further grooves in close proximity to the first edge portion, the second edge portion, the third edge portion, and the fourth edge portion.

In an embodiment, the first liquid crystal domain, the second liquid crystal domain, the third liquid crystal domain, and the fourth liquid crystal domain are each adjacent to another liquid crystal domain and are arranged in a matrix of two rows and two columns.

In an embodiment, the first liquid crystal domain, the second liquid crystal domain, the third liquid crystal domain, and the fourth liquid crystal domain are arranged so that the tilt directions of adjacent liquid crystal domains differ by substantially 90 degrees from each other.

In an embodiment, assuming that an azimuth of a horizontal direction on the display surface is 0 degree, the first direction is at substantially 45 degrees, substantially 135 degrees, substantially 225 degrees, or substantially 315 degrees.

In an embodiment, the liquid crystal display device further includes a pair of polarizing plates opposed to each other with the liquid crystal layer interposed therebetween and arranged so that their respective transmission axes are substantially orthogonal to each other, and the first direction, the second direction, the third direction, and the fourth direction each form an angle of substantially 45 degrees with each of the transmission axes of the pair of polarizing plates.

In an embodiment, the liquid crystal layer contains liquid crystal molecules having negative dielectric anisotropy.

In an embodiment, the first alignment film and the second alignment film define pretilt angles, respectively, that are substantially equal to each other.

In an embodiment, the first alignment film and the second alignment film are each a photo-alignment film.

Advantageous Effects of Invention

An embodiment of the present invention makes it possible to reduce the area of a dark line that appears within a pixel of a VA mode liquid crystal display device having an alignment multi-domain structure formed by defining a pretilt direction with an alignment film.

DESCRIPTION OF EMBODIMENTS

Figure 1:
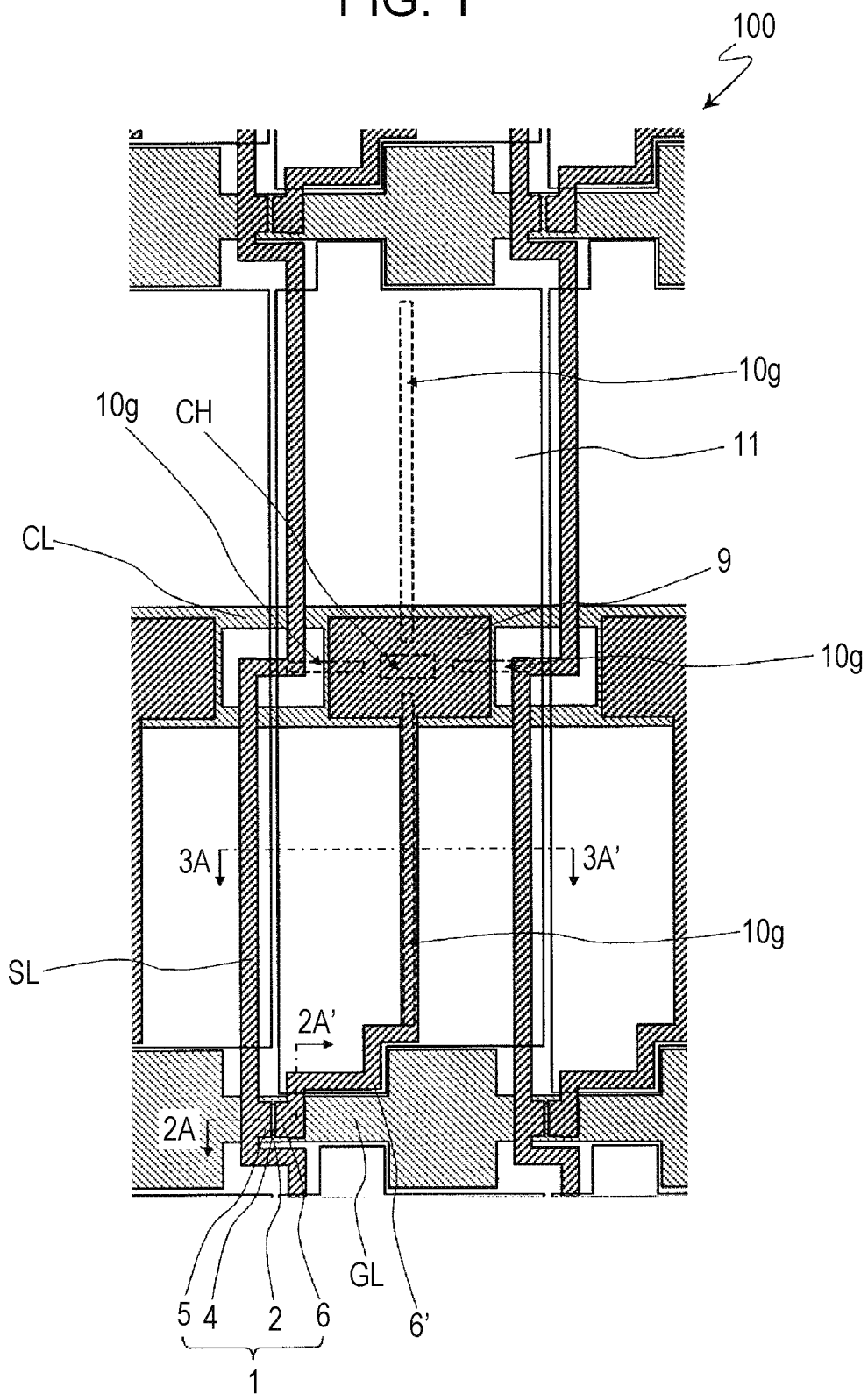
FIG. 1 is a plan view schematically showing a liquid crystal display device 100 according to an embodiment of the present invention.

First, main terms used herein are explained.

The term "vertically-aligned liquid crystal layer" used herein means a liquid crystal layer containing liquid crystal molecules aligned at an angle of not smaller than approximately 85 degrees with respect to a surface of an alignment film (vertical alignment film). The liquid crystal molecules contained in the vertically-aligned liquid crystal layer have negative dielectric anisotropy. A normally black mode display is performed by combining the vertically-aligned liquid crystal layer with a pair of polarizing plates placed in a crossed-Nicol arrangement so as to be opposed to each other with the liquid crystal layer interposed therebetween (i.e. placed so that their respective transmission axes are substantially orthogonal to each other).

Further, the term "pixel" used herein refers to a minimum unit of representation of a particular level of gray in a display. In the case of a color display, for example, the pixel corresponds to a unit of representation of a level of each of R, G, and B, and is also called "dot". A combination of an R pixel, a G pixel, and a B pixel constitutes a single color display pixel. Further, a region (pixel region) of a liquid crystal display device corresponding to a "pixel" of a display is also called "pixel".

The term "pretilt direction" refers to a direction of alignment of liquid crystal molecules that is defined by an alignment film and to an azimuth direction in a display surface. Further, an angle that the liquid crystal molecules form with a surface of the alignment film is called "pretilt angle". It should be noted that performing a process by which to cause the alignment film to exhibit an ability to define a pretilt direction as a predetermined direction is herein expressed as "imparting a pretilt direction to the alignment film", and a pretilt direction that is defined by the alignment film is sometimes simply called "pretilt direction of the alignment film". Imparting of a pretilt direction to the alignment film is performed, for example, by the after-mentioned rubbing treatment, the after-mentioned photo-alignment treatment, or the like.

A quartered structure can be formed by changing a combination of pretilt directions defined by a pair of alignment films opposed to each other with a liquid crystal layer interposed therebetween. A quartered pixel region has four liquid crystal domains.

Each of the liquid crystal domains is characterized by a tilt direction (sometimes also referred to as "reference alignment direction") of liquid crystal molecules near the center of the liquid crystal layer in in-plane and thickness directions in the presence of a voltage applied to the liquid crystal layer, and this tilt direction (reference alignment direction) has a dominant influence on the viewing angle dependency of that domain. This tilt direction too is an azimuth direction. A basis for an azimuth direction is a horizontal direction on the display surface and is assumed positive in a left hand turn (the display surface being compared to the face of a clock, it is an azimuth of 0 degree in a 3 o'clock direction and is assumed positive in a counterclockwise direction). By setting the tilt directions of the four liquid crystal domains to be four directions (e.g. a 12 o'clock direction, a 9 o'clock direction, a 6 o'clock direction, and a 3 o'clock direction) any two of which have a difference therebetween that is substantially equal to an integral multiple of 90 degrees, viewing angle characteristics are averaged, so that a satisfactory display is attained. Further, from the point of view of uniformity of viewing angle characteristics, it is preferable that the four liquid crystal domains occupy substantially equal areas within the pixel region.

A vertically-aligned liquid crystal layer that is illustrated in an embodiment below contains liquid crystal molecules having negative dielectric anisotropy (i.e. a nematic liquid crystal material having negative dielectric anisotropy). A pretilt direction that is defined by one alignment film and a pretilt direction that is defined by the other alignment film differ by substantially 90 degrees from each other. A tilt direction (reference alignment direction) is defined as a direction intermediate between these two pretilt directions. With no chiral agent added, liquid crystal molecules in the vicinity of the alignment films assume twisted alignment in accordance with the alignment-regulating forces of the alignment films when a voltage has been applied to the liquid crystal layer. A chiral agent may be added as needed. Thus, a VA mode in which liquid crystal molecules are brought into twisted alignment by using a pair of vertical alignment films provided so that their pretilt directions (alignment treatment directions) are orthogonal to each other is sometimes also called "VATN (vertical alignment twisted nematic) mode".

In the VATN mode, it is preferable that pretilt angles that are defined by a pair of alignment films, respectively, be substantially equal to each other. By the pretilt angles being substantially equal, an advantage is obtained in that display luminance characteristics can be improved. In particular, by keeping the difference between the pretilt angles within 1 degree, it is made possible to stably control the pretilt direction (reference alignment direction) of liquid crystal molecules near the center of the liquid crystal layer, so that the display luminance characteristics can be improved. A possible reason for this is that when the difference between the pretilt angles exceeds 1 degree, the tilt direction becomes misaligned from a predetermined direction and this misalignment results in the formation of a region whose transmittance is lower than a desired transmittance.

Known examples of methods for imparting a pretilt direction to an alignment film include a method for applying rubbing treatment, a method for applying photo-alignment treatment, a method for forming a fine structure as a foundation for an alignment film in advance and reflecting the fine structure in a surface of the alignment film, a method for forming an alignment film with a fine structure on a surface thereof by oblique deposition of an inorganic substance such as SiO, and the like. From the point of view of mass-producibility, the rubbing treatment or the photo-alignment treatment is preferred. In particular, since the photo-alignment treatment, which allows non-contact processing, can improve yields without generation of static electricity by friction unlike in the case of the rubbing treatment. Furthermore, the use of a photo-alignment film containing a photosensitive group makes it possible to control a variation in pretilt angle to not greater than 1 degree. It is preferable to include, as the photosensitive group, at least one photosensitive group selected from the group consisting of a 4-chalcone group, a 4'-chalcone group, a coumarin group, and a cinnamoyl group.

Next, an aligned multi-domain structure in a 4D-RTN mode is described.

Figure 34:
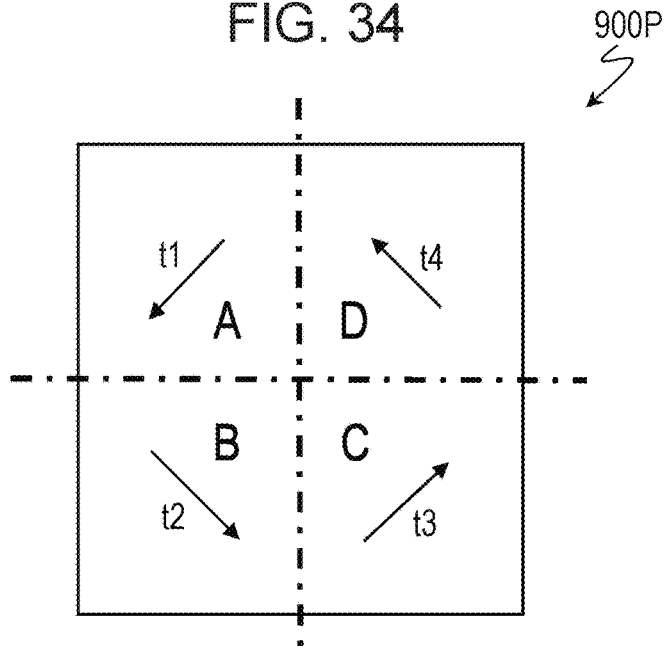
FIG. 34 is a diagram showing an aligned multi-domain structure of a pixel 900P of a common 4D-RTN mode liquid crystal display device.

FIG. 34 is a diagram showing an aligned multi-domain structure of a pixel 900P of a common 4D-RTN mode liquid crystal display device. During the application of a voltage to the liquid crystal layer, the pixel 900P has four liquid crystal domains A, B, C, and D formed as shown in FIG. 34. The four liquid crystal domains A, B, C, and D are arranged in a matrix of two rows and two columns.

The liquid crystal domains A, B, C, and D have directors t1, t2, t3, and t4, respectively, whose bearings are four bearings any two directions of which have a difference therebetween that is substantially equal to an integral multiple of 90 degrees. Each of the directors t1, t2, t3, and t4 represents the direction of alignment of liquid crystal molecules contained in the corresponding one of the liquid crystal domains and, in the 4D-RTN mode, is the tilt direction of liquid crystal molecules near the center of the liquid crystal layer in the in-plane and thickness directions in the presence of a voltage applied to the liquid crystal layer. Each of the liquid crystal domains is characterized by the bearing (i.e. the aforementioned tilt direction) of the corresponding one of the directors, and this bearing of the director has a dominant influence on the viewing angle dependency of that domain.

Note here that a pair of polarizing plates opposed to each other with the liquid crystal layer interposed therebetween are arranged so that their respective transmission axes (polarizing axes) are orthogonal to each other and, more specifically, are arranged so that one of the transmission axes is parallel to the horizontal direction on the display surface and the other of the transmission axes is parallel to a vertical direction on the display surface.

Assuming that the azimuth (3 o'clock direction) of the horizontal direction on the display surface is 0 degree, the bearing of the director t1 of the liquid crystal domain A is substantially a 225-degree direction, the bearing of the director t2 of the liquid crystal domain B substantially a 315-degree direction, the bearing of the director t3 of the liquid crystal domain C substantially a 45-degree direction, and the bearing of the director t4 of the liquid crystal domain D substantially a 135-degree direction. That is, the liquid crystal domains A, B, C, and D are arranged so that the bearings of the directors of adjacent liquid crystal domains differ by substantially 90 degrees from each other.

Figure 35:
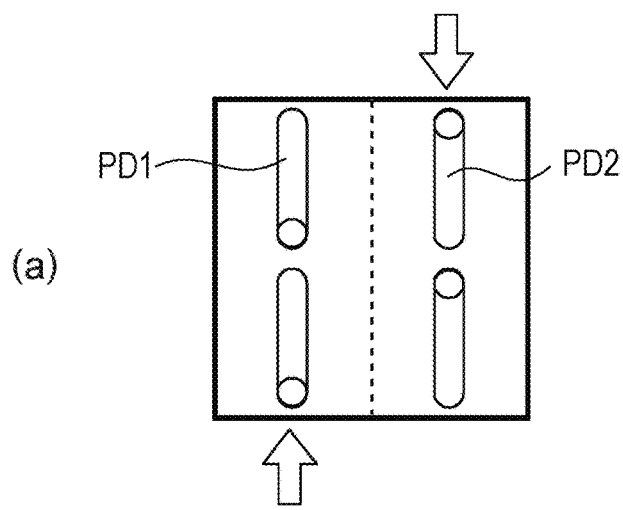
FIG. 35 illustrates diagrams (a), (b), and (c) for explaining a method for obtaining the aligned multi-domain structure of the pixel 900P shown in FIG. 34.
Figure 35:
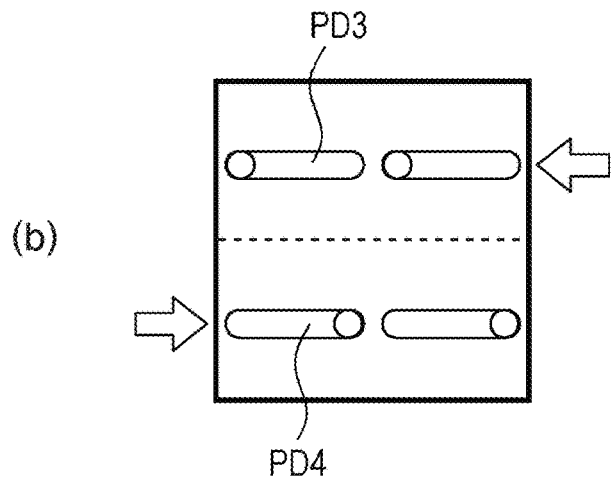
Figure 35:
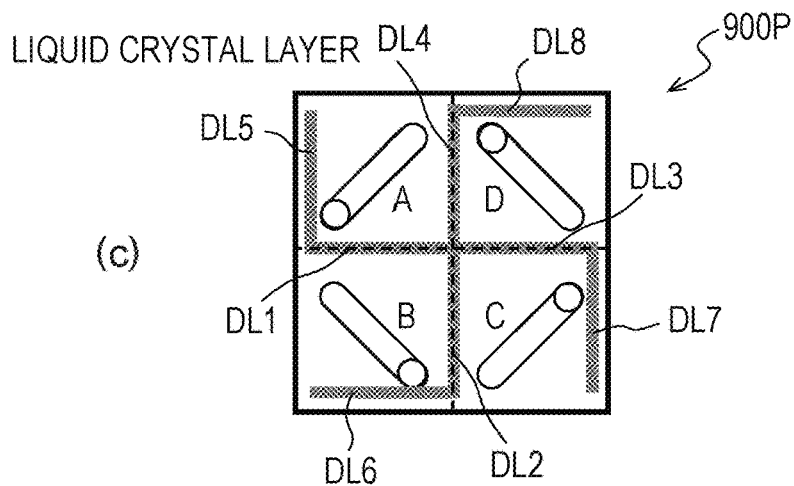

A method for obtaining the aligned multi-domain structure of the pixel 900P shown in FIG. 34 is explained here with reference to FIGS. 35(a), 35(b), and 35(c). FIG. 35(a) shows pretilt directions PD1 and PD2 that are defined by an alignment film provided in an active matrix substrate, and FIG. 35(b) shows pretilt directions PD3 and PD4 that are defined by an alignment film provided in a counter substrate. Further, FIG. 35(c) shows a tilt direction (director) in the presence of a voltage applied to the liquid crystal layer after the active matrix substrate and the counter substrate have been bonded together.

As shown in FIG. 35(a), a region on the active matrix substrate side (i.e. a region corresponding to one pixel 900P) is halved into right and left parts, and these regions (right and left regions) have their alignment films (vertical alignment films) subjected to alignment treatment so as to define the pretilt directions PD1 and PD2, which are antiparallel to each other. Here is applied photo-alignment treatment by oblique irradiation with ultraviolet rays from the directions indicated by the arrows.

Meanwhile, as shown in FIG. 35(b), a region on the counter substrate side (i.e. a region corresponding to one pixel 900P) is halved into upper and lower parts, and these regions (upper and lower regions) have their alignment films (vertical alignment films) subjected to alignment treatment so as to define the pretilt directions PD3 and PD4, which are antiparallel to each other. Here is applied photo-alignment treatment by oblique irradiation with ultraviolet rays from the directions indicated by the arrows.

By bonding together the active matrix substrate and the counter substrate subjected to alignment treatment as shown in FIGS. 35(a) and 35(b), respectively, an aligned multi-domain pixel 900P can be formed as shown in FIG. 35(c). As can be seen from FIGS. 35(a), 35(b), and 35(c), a pretilt direction that is defined by the photo-alignment film of the active matrix substrate and a pretilt direction that is defined by the photo-alignment film of the counter substrate differ by substantially 90 degrees from each other in each of the liquid crystal domains A to D, and a tilt direction (i.e. the bearing of the director of that liquid crystal domain) is defined as a direction intermediate between these two pretilt directions.

Further, as shown in FIG. 35(c), dark lines DL1 to DL8 appear within the pixel 900P having the aligned multi-domain structure. These dark lines DL1 to DL8 include the dark lines DL1 to DL4, which appear at boundaries between adjacent liquid crystal domains, and the dark lines DL5 to DL8, which appear in the vicinity of edges of a pixel electrode. In the example shown in FIG. 35(c), the dark lines DL1 to DL8 form a counterclockwise swastika as a whole. The following explains, with reference to FIGS. 36(a) and 36(b), reasons why such dark lines DL1 to DL8 appear. FIGS. 36(a) and 36(b) are a cross-sectional view and a plan view, respectively, schematically showing a state of alignment of liquid crystal molecules 931 in the pixel 900P.

First, the reason why the dark lines DL1 to DL4 appear is explained.

Application of a voltage between a pixel electrode 911 and a counter electrode 921 causes a longitudinal electric field to be generated in the liquid crystal layer, so that the liquid crystal molecules 931 of the liquid crystal layer become aligned in a direction orthogonal to the electric field. That is, the liquid crystal molecules 931 put themselves in a position in which they are flat on a substrate surface. At this point of time, the bearing of the director of a liquid crystal molecule 931 in each liquid crystal domain is defined by a pretilt direction (indicated by a dotted arrow in FIG. 36(b)) defined by the alignment film on the active matrix substrate side and a pretilt direction (indicated by a solid arrow in FIG. 36(b)) defined by the alignment film on the counter substrate side. Specifically, the bearings of the directors of the liquid crystal domains A, B, C, and D become a substantially 225-degree direction, a substantially 315-degree direction, a substantially 45-degree direction, and a substantially 135-degree direction, respectively.

There is a continuous change in direction of alignment of liquid crystal molecules 931 (due to the properties of a liquid crystal as a continuous elastic body) in the vicinity of a boundary between adjacent liquid crystal domains. Therefore, at a boundary between the liquid crystal domain A and the liquid crystal domain B, a liquid crystal molecule 931 is aligned in a substantially 270-degree direction. Similarly, at a boundary between the liquid crystal domain B and the liquid crystal domain C, a boundary between the liquid crystal domain C and the liquid crystal domain D, and a boundary between the liquid crystal domain D and the liquid crystal domain A, liquid crystal molecules 931 are aligned in a substantially 0-degree direction, a substantially 90-degree direction, a substantially 180-degree direction, and a substantially 270-degree direction, respectively. Since a 0-degree direction, a 90-degree direction, a 180-degree direction, and a 270-degree direction are directions parallel or orthogonal to each of the respective transmission axes of the pair of polarizing plates, the dark lines DL1 to DL4 appear at the boundaries between adjacent liquid crystal domains.

Next, the reason why the dark lines DL5 to DL8 appear is explained.

If an edge of the pixel electrode 911 located close to a liquid crystal domain has a portion (hereinafter called "edge portion") in which an azimuth direction orthogonal to the edge portion toward the inside of the pixel electrode 911 forms an angle of greater than 90 degrees with the tilt direction (reference alignment direction) of the liquid crystal domain, a dark line that is parallel to the edge portion is formed closer to the inside than the edge portion.

Figure 36:
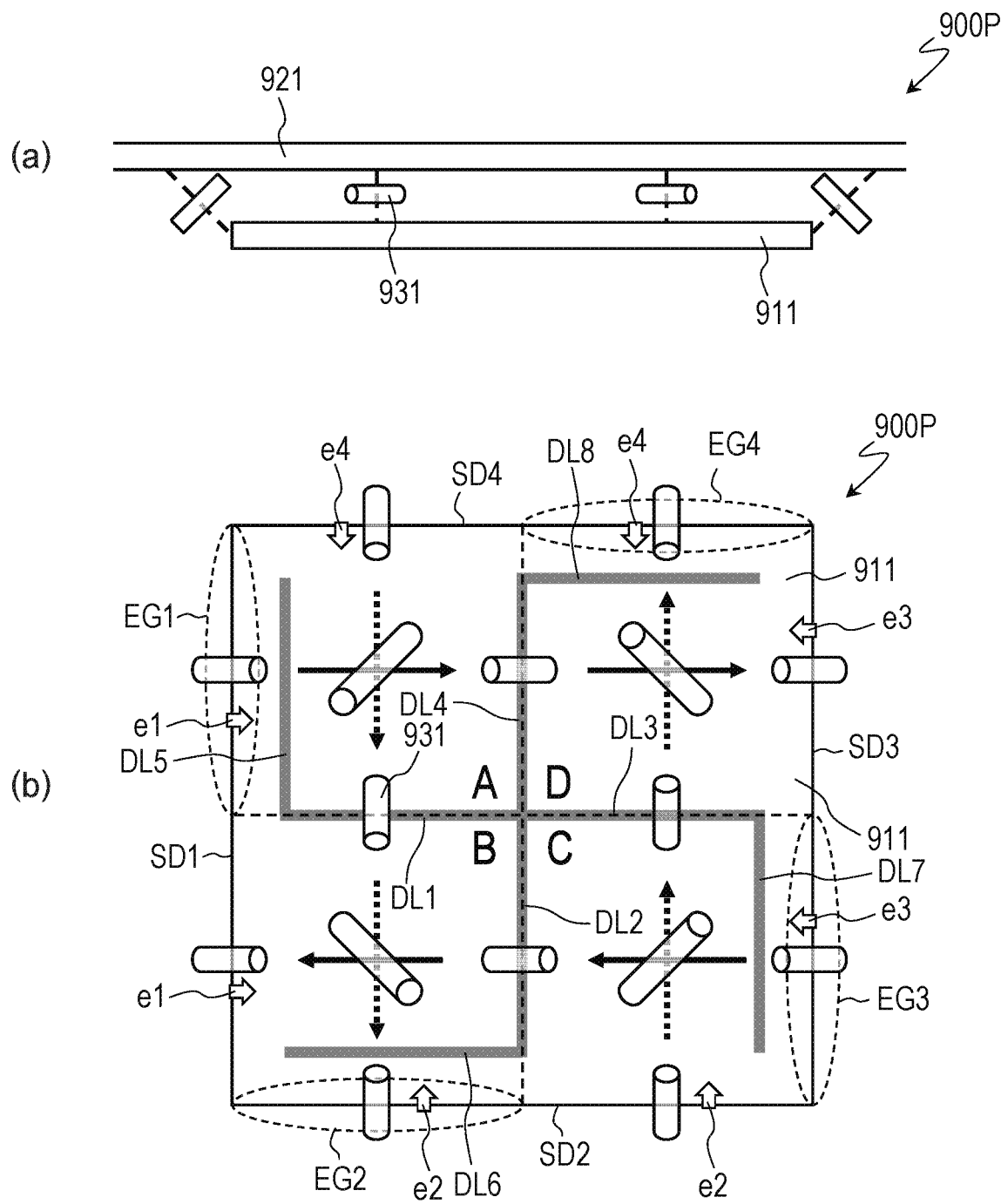
FIG. 36 illustrates a cross-sectional view (a) and a plan view (b) both schematically showing a state of alignment of liquid crystal molecules 931 in the pixel 900P.

As shown in FIG. 36(*b*), the pixel electrode 911 has four edges (sides) SD1, SD2, SD3, and SD4, and oblique electric fields that are generated at these edges SD1, SD2, SD3, and SD4 during the application of a voltage exert alignment-regulating forces having components of directions (azimuth directions) orthogonal to the respective edges toward the inside of the pixel electrode 911. In FIG. 36(*b*), the azimuth directions orthogonal to the edges SD1, SD2, SD3, and SD4 toward the inside of the pixel electrode 911 are indicated by arrows e1, e2, e3, and e4, respectively.

Each of the four liquid crystal domains A, B, C, and D is located close to two of the four edges SD1, SD2, SD3, and SD4 of the pixel electrode 911 and, during the application of a voltage, is subjected to alignment-regulating forces exerted by oblique electric fields generated at the two edges.

In an edge portion EG1 (upper half of the left edge SD1) of an edge of the pixel electrode 911 located close to the liquid crystal domain A, the azimuth direction e1 orthogonal to the edge portion EG1 toward the inside of the pixel electrode 911 forms an angle of greater than 90 degrees (specifically substantially 135 degrees) with the tilt direction t1 of the liquid crystal domain A. As a result, the dark line DL 5, which is parallel to the edge portion EG1, appears in the liquid crystal domain A during the application of a voltage.

Similarly, in an edge portion EG2 (left half of the lower edge SD2) of an edge of the pixel electrode 911 located close to the liquid crystal domain B, the azimuth direction e2 orthogonal to the edge portion EG2 toward the inside of the pixel electrode 911 forms an angle of greater than 90 degrees (specifically substantially 135 degrees) with the tilt direction t2 of the liquid crystal domain B. As a result, the dark line DL 6, which is parallel to the edge portion EG2, appears in the liquid crystal domain B during the application of a voltage.

Similarly, in an edge portion EG3 (lower half of the right edge SD3) of an edge of the pixel electrode 911 located close to the liquid crystal domain C, the azimuth direction e3 orthogonal to the edge portion EG3 toward the inside of the pixel electrode 911 forms an angle of greater than 90 degrees (specifically substantially 135 degrees) with the tilt direction t3 of the liquid crystal domain C. As a result, the dark line DL 7, which is parallel to the edge portion EG3, appears in the liquid crystal domain C during the application of a voltage.

Similarly, in an edge portion EG4 (right half of the upper edge SD4) of an edge of the pixel electrode 911 located close to the liquid crystal domain D, the azimuth direction e4 orthogonal to the edge portion EG4 toward the inside of the pixel electrode 911 forms an angle of greater than 90 degrees (specifically substantially 135 degrees) with the tilt direction t4 of the liquid crystal domain D. As a result, the dark line DL 8, which is parallel to the edge portion EG4, appears in the liquid crystal domain D during the application of a voltage.

Figure 37:
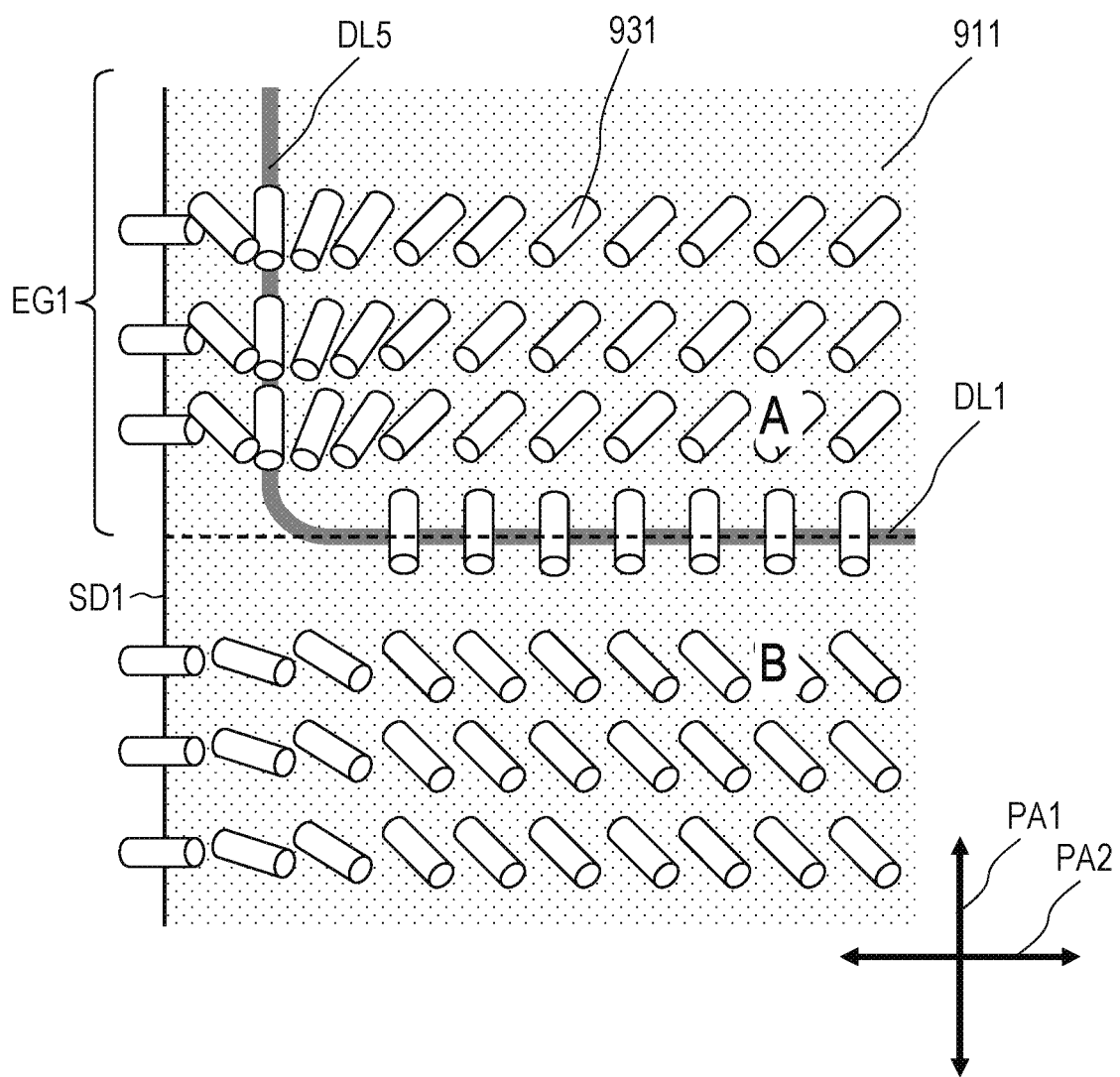
FIG. 37 is a plan view showing a state of alignment of liquid crystal molecules 931 in the vicinity of an edge SD1 of a pixel electrode 911.

FIG. 37 shows a state of alignment of liquid crystal molecules 931 in the vicinity of the edge SD1. In the vicinity of the edge portion EG1 of the edge SD1, as shown in FIG. 37, a continuous change in alignment from a direction (substantially 0-degree direction) orthogonal to the edge SD1 to the tilt direction t1 (substantially 225-degree direction) of the liquid crystal domain A results in the formation of a region where liquid crystal molecules 931 are aligned in a direction (substantially 270-degree direction) substantially parallel or substantially orthogonal to the transmission axes PA1 and PA2 of the pair of polarizing plates. This region constitutes the dark line DL5.

Meanwhile, in the vicinity of a portion of the edge SD1 other than the edge portion EG1, there is a continuous change from a direction (substantially 0-degree direction) orthogonal to the edge SD1 to the tilt direction t2 (substantially 315-degree direction) of the liquid crystal domain B, but there is no region where liquid crystal molecules 931 are aligned in a direction substantially parallel or substantially orthogonal to the transmission axes PA1 and PA2 of the polarizing plates. Therefore, no dark line appears.

For similar reasons, while the dark lines DL6, DL7, and DL8 appear in the vicinity of the edge portions EG2, EG3, and EG4 of the other edges SD2, SD3, and SD4, no dark lines appear in the vicinity of portions of the other edges SD2, SD3, and SD4 other than the edge portions EG2, EG3, and EG4.

These dark lines which appear through the aforementioned mechanism cause a decrease in transmittance of a pixel. By having a configuration that is described below, a liquid crystal display device according to an embodiment of the present invention makes it possible to reduce the area (width) of a dark line that appears within a pixel.

The following describes embodiments of the present invention with reference to the drawings. It should be noted that the present invention is not limited to the following embodiments.

Embodiment 1

Figure 2:
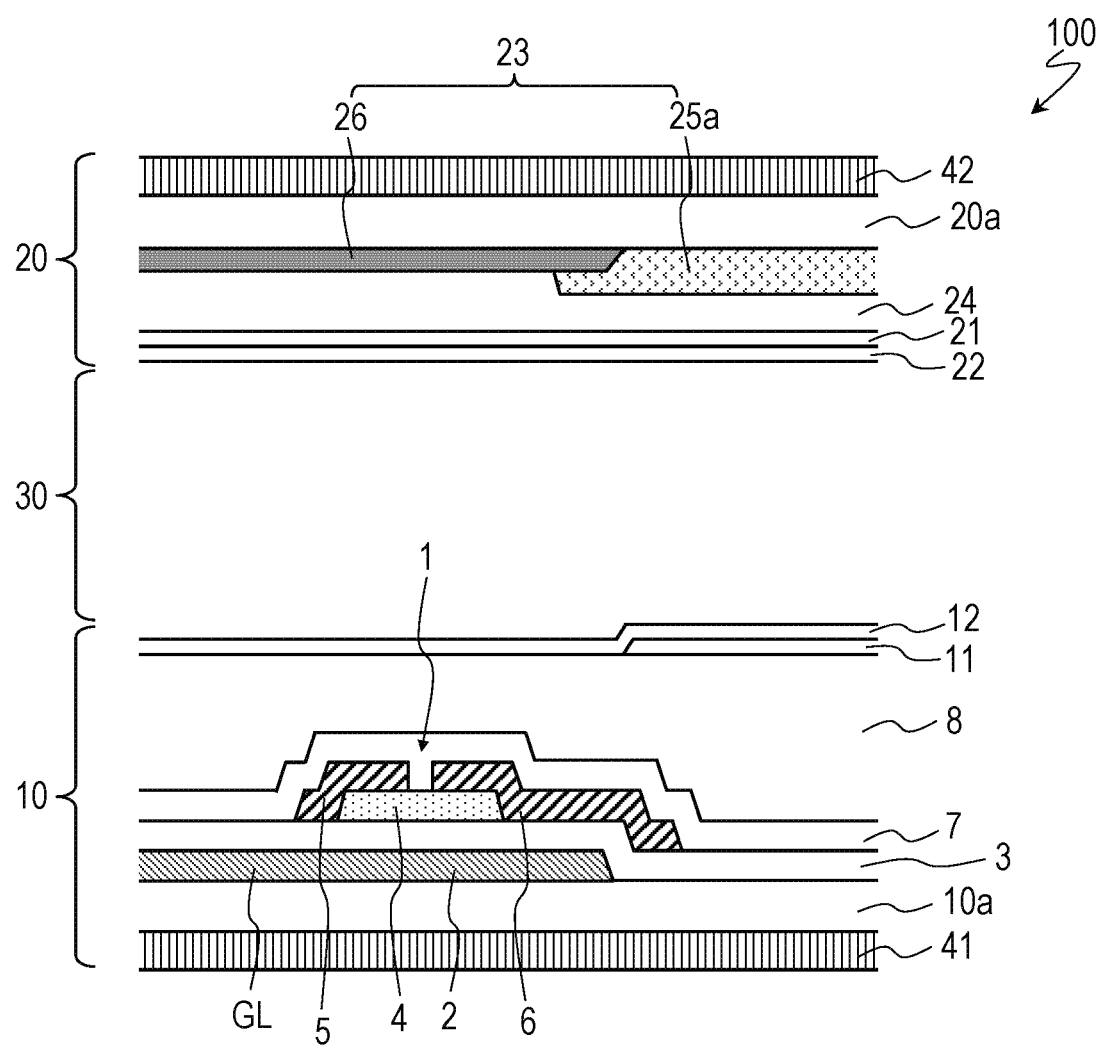
FIG. 2 is a schematic cross-sectional view of the liquid crystal display device 100 as taken along line 2A-2A' in FIG. 1.
Figure 3:
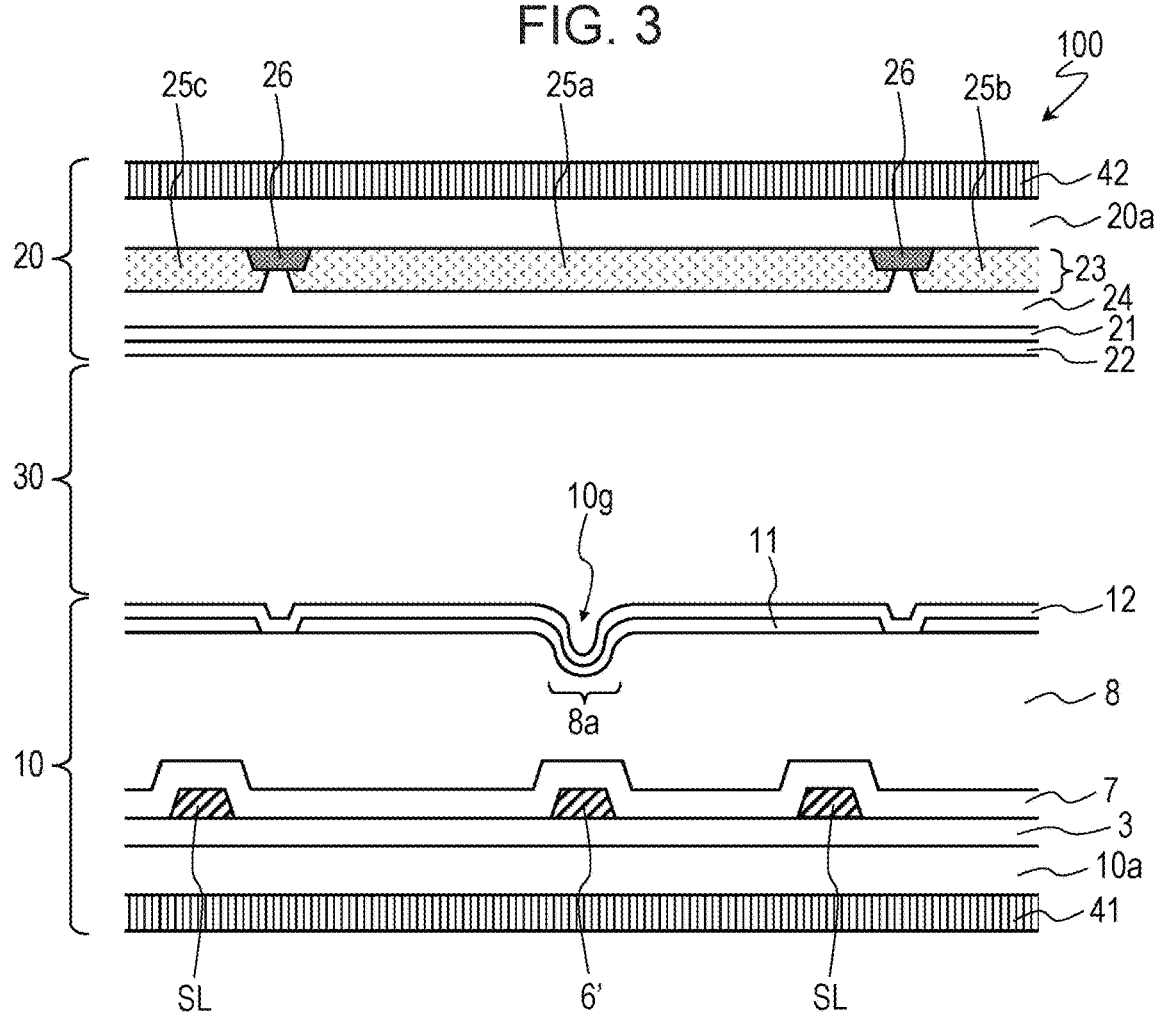
FIG. 3 is a schematic cross-sectional view of the liquid crystal display device 100 as taken along line 3A-3A' in FIG. 1.

FIGS. 1, 2, and 3 show a liquid crystal display device 100 according to the present embodiment. FIG. 1 is a plan view schematically showing the liquid crystal display device 100. FIGS. 2 and 3 are cross-sectional views taken along lines 2A-2A' and 3A-3A', respectively, in FIG. 1.

The liquid crystal display device 100 includes an arrangement of an active matrix substrate (first substrate) 10 and a counter substrate (second substrate) 20 that are opposed to each other and a vertically-aligned liquid crystal layer 30 provided between these substrates. Further, the liquid crystal display device 100 includes a plurality of pixels arranged in a matrix. FIG. 1 shows a pixel and a part of a pixel that is adjacent to the pixel.

The active matrix substrate 10 includes a pixel electrode 11 provided in each of the plurality of pixels and a first alignment film 12 provided between the pixel electrode 11 and the liquid crystal layer 30 (i.e. as the outermost surface of the active matrix substrate 10 that faces the liquid crystal layer 30). The counter substrate 20 includes a counter electrode 21 opposed to the pixel electrode 11 and a second alignment film 22 provided between the counter substrate 21 and the liquid crystal layer 30 (i.e. as the outermost surface of the counter substrate 20 that faces the liquid crystal layer 30). The pixel electrode 11 and the counter electrode 21 are made of a transparent electrical conducting material (e.g. ITO). The first alignment film 12 and the second alignment film 22 have alignment-regulating forces to align liquid crystal molecules substantially vertically to their surfaces. The first alignment film 12 and the second alignment film 22 are each a photo-alignment film here. The following more specifically describes the respective configurations of the active matrix substrate 10 and the counter substrate 20.

The active matrix substrate 10 further includes a substrate 10a, a plurality of TFTs (thin-film transistors) 1 supported by the substrate 10a, a plurality of gate lines (scanning lines) GL that extend in a row-wise direction, a plurality of source lines (signal lines) SL that extend in a column-wise direction, and a plurality of auxiliary capacitor lines CL that extend in the row-wise direction.

The substrate 10a is transparent and has insulation properties. The substrate 10a is for example a glass substrate or a plastic substrate.

Each of the plurality of TFTs 1 is placed in a corresponding one of the pixels. Each TFT 1 includes a gate electrode 2, a semiconductor layer 4, a source electrode 5, and a drain electrode 6. The TFT 1 illustrated is a bottom-gate TFT having a channel etch structure.

The gate electrode 2 is formed over the substrate 10a, and is electrically connected to a corresponding one of the gate lines GL. A gate insulating layer 3 is formed so as to cover the gate electrode 2. In the configuration illustrated here, the gate electrode 2 and the gate line GL are integrally formed, and a portion of the gate line GL that overlaps the semiconductor layer 4 via the gate insulating layer 3 functions as the gate electrode 2. The auxiliary capacitor lines CL are formed by the same conducting layer as the gate lines GL and the gate electrodes 2.

The semiconductor layer 4 is formed over the gate insulating layer 3. The semiconductor layer 4 may be made of any of various publicly-known semiconductor materials examples of which include amorphous silicon, polycrystalline silicon, continuous grain silicon (CGS), and the like.

The semiconductor layer 4 may be an oxide semiconductor layer formed from an oxide semiconductor. The oxide semiconductor layer contains, for example, an In—Ga—Zn—O semiconductor. Note here that the In—Ga—Zn—O semiconductor is a ternary oxide of In (indium), Ga (gallium), and Zn (zinc) and the proportions (composition ratios) of In, Ga, and Zn are not limited to any particular proportions and include, for example, In:Ga:Zn=2:2:1, In:Ga:Zn=1:1:1, and In:Ga:Zn=1:1:2, and the like.

The In—Ga—Zn—O semiconductor may be amorphous or crystalline. A preferred crystalline In—Ga—Zn—O semiconductor has its c axis aligned substantially vertically to a layer plane. A crystal structure of such an In—Ga—Zn—O semiconductor is disclosed, for example, in Japanese Unexamined Patent Application Publication No. 2012-134475. The entire contents of Japanese Unexamined Patent Application Publication No. 2012-134475 are hereby incorporated by reference.

A TFT having an In—Ga—Zn—O semiconductor layer has a high mobility (more than 20 times higher than that of an a-Si TFT) and a low leakage current (less than 1/100 of that of an a-Si TFT). Accordingly, using as the semiconductor layer an oxide semiconductor layer formed from an In—Ga—Zn—O semiconductor makes it possible to achieve a further reduction in power consumption, as the off-leakage current is low.

The oxide semiconductor layer may contain another oxide semiconductor instead of the In—Ga—Zn—O semiconductor. For example, the oxide semiconductor layer may contain an In—Sn—Zn—O semiconductor (e.g. $In_2O_3$—$SnO_2$—ZnO; InSnZnO). The In—Sn—Zn—O semiconductor is a ternary oxide of In (indium), Sn (tin), and Zn (zinc). Alternatively, the oxide semiconductor layer may contain an In—Al—Zn—O semiconductor, an In—Al—Sn—Zn—O semiconductor, a Zn—O semiconductor, an In—Zn—O semiconductor, a Zn—Ti—O semiconductor, a Cd—Ge—O semiconductor, a Cd—Pb—O semiconductor, a CdO (cadmium oxide), a Mg—Zn—O semiconductor, an In—Ga—Sn—O semiconductor, an In—Ga—O semiconductor, a Zr—In—Zn—O semiconductor, a Hf—In—Zn—O semiconductor, an Al—Ga—Zn—O semiconductor, a Ga—Zn—O semiconductor, or the like.

The source electrode 5 and the drain electrode 6 are formed over the gate insulating layer 3. The source electrode 5 is electrically connected to a corresponding one of the source lines SL. In the configuration illustrated, the source electrode 5 extends from the source line SL. The source electrode 5 is in contact with a part (source region) of the semiconductor layer 4. The drain electrode 6 is electrically connected to the pixel electrode 11. The drain electrode 6 is in contact with another part (drain region) of the semiconductor layer 4.

An auxiliary capacitor electrode 9 is formed over the gate insulating layer 3 so as to overlap a corresponding one of the auxiliary capacitor lines CL. The auxiliary capacitor electrode 9 is electrically connected to the drain electrode 6 via a portion (drain extension portion) 6' extending from the drain electrode 6. The auxiliary capacitor electrode 9, the auxiliary capacitor line CL, and a part of the gate insulating layer 3 between the auxiliary capacitor electrode 9 and the auxiliary capacitor line CL form an auxiliary capacitor.

An inorganic insulating layer 7 is provided so as to cover the TFT 1, the source line SL, the auxiliary capacitor electrode 9, and the like. The inorganic insulating layer 7 is formed from an inorganic insulating material (e.g. silicon oxide or silicon nitride). An organic insulating payer 8 is provided over the inorganic insulating layer 7. The organic insulating layer 8 is formed from an organic insulating material (e.g. a photosensitive resin material).

The pixel electrode 11 is formed over the organic insulating layer 8. Conversely, the organic insulating layer 8 is formed under the pixel electrode 11. The first alignment film 12 is formed so as to cover the pixel electrode 11. The pixel electrode 11 is in contact with the auxiliary capacitor electrode 9 in a contact hole CH formed in the inorganic insulating layer 7 and the organic insulating layer 8, and is electrically connected to the drain electrode 6 of the TFT 1 via the auxiliary capacitor electrode 9 and the drain extension portion 6'.

The counter substrate 20 further includes a substrate 20a, a color filter layer 23 supported by the substrate 20a, and a planarizing layer (overcoat layer) 24 covering the color filter layer 23.

The substrate 20a is transparent and has insulation properties. The substrate 20a is for example a glass substrate or a plastic substrate.

The color filter layer 23 is formed over the substrate 20a. The color filter layer 23 includes a first color filter 25a, a second color filter 25b, a third color filter 25c, and a light-blocking layer (black matrix) 26. The first color filter 25a, the second color filter 25b, and the third color filter 25c are for example a red color filter, a green color filter, and a blue color filter.

The planarizing layer 24 is formed over the color filter layer 23. The planarizing layer 24 is formed, for example, from a transparent resin material.

The counter electrode 21 is provided over the planarizing layer 24. The second alignment film 22 is formed so as to cover the counter electrode 21.

The liquid crystal display device 100 further includes a pair of polarizing plates 41 and 42 opposed to each other with the liquid crystal layer 30 interposed therebetween. The pair of polarizing plates 41 and 42 are placed so that their respective transmission axes are substantially orthogonal to each other (i.e. placed in a crossed-Nicol arrangement).

In the liquid crystal display device 100 according to the present embodiment, as shown in FIGS. 1 and 3, the surface of the active matrix substrate 10 that faces the liquid crystal layer 30 has a groove 10g within each pixel. In the configuration illustrated, the groove 10g is defined by a depressed portion 8a formed in the organic insulating layer 8. The pixel electrode 11 and the first alignment film 12, which are located above the organic insulating layer 8, have depressions in regions corresponding to the groove 10g (that is, the pixel electrode 11 and the first alignment film 12 have their surfaces shaped in conformance with the shape of the depressed portion 8a of the organic insulating layer 8). The placement of a groove 10g within each pixel will be described in detail later.

Next, an aligned multi-domain structure of a pixel P of the liquid crystal display device 100 according to the present embodiment is described with reference to FIG. 4.

Figure 4:
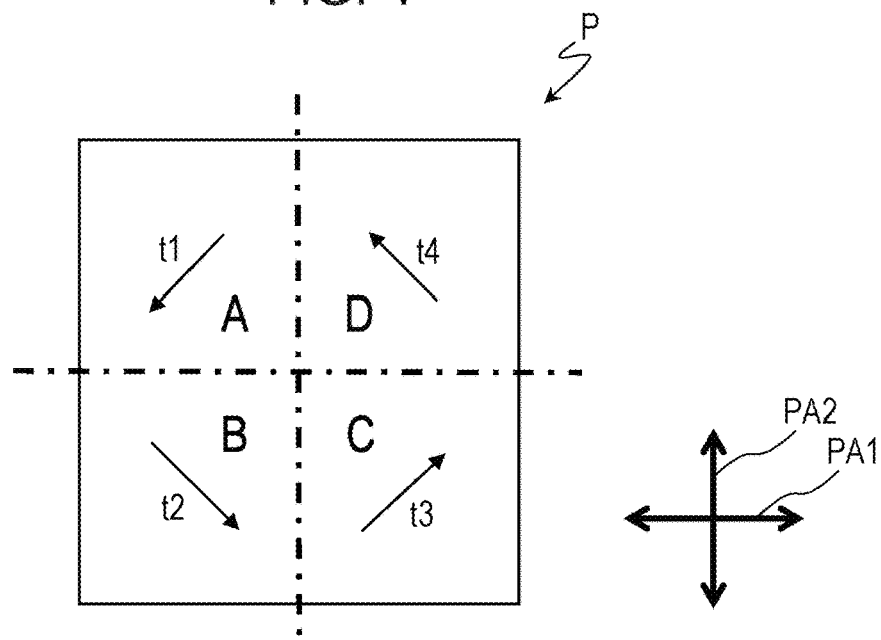
FIG. 4 is a diagram showing an aligned multi-domain structure of a pixel P of the liquid crystal display device 100.

When a voltage has been applied between the pixel electrode 11 and the counter electrode 21, the liquid crystal layer 30 comes to have four liquid crystal domains A, B, C, and D formed within each pixel P as shown in FIG. 4. The four liquid crystal domains A, B, C, and D are arranged in a matrix of two rows and two columns. The bearings of the four directors t1, t2, t3, and t4 that represent the directions of alignment of liquid crystal molecules contained in the respective liquid crystal domains A, B, C, and D are different from one another.

Assuming that the azimuth (3 o'clock direction) of the horizontal direction on the display surface is 0 degree, the bearing of the director t1 of the liquid crystal domain A is substantially a 225-degree direction, the bearing of the director t2 of the liquid crystal domain B substantially a 315-degree direction, the bearing of the director t3 of the liquid crystal domain C substantially a 45-degree direction, and the bearing of the director t4 of the liquid crystal domain D substantially a 135-degree direction. That is, the difference between any two of the bearings of the four directors of the liquid crystal domains A, B, C, and D is substantially equal to an integral multiple of 90 degrees. Further, the liquid crystal domains A, B, C, and D are arranged so that the bearings of the directors of adjacent liquid crystal domains differ by substantially 90 degrees from each other.

One of the transmission axes (polarizing axes) PA1 and PA2 of the pair of polarizing plates 41 and 42 is parallel to the horizontal direction on the display surface and the other of the transmission axes PA1 and PA2 is parallel to the vertical direction on the display surface. Accordingly, the transmission axes PA1 and PA2 of the polarizing plates 41 and 42 each form an angle of substantially 45 degrees with each of the bearings of the directors t1, t2, t3, and t4 of the liquid crystal domains A, B, C, and D.

Although FIG. 4 illustrates a case where the four liquid crystal domains A, B, C, and D occupy equal areas within the pixel P, the areas of the four liquid crystal domains A, B, C, and D do not need to be equal to one another. However, from the point of view of uniformity of viewing angle characteristics, it is preferable that the areas of the four liquid crystal domains A, B, C, and D differ as little as possible from one another. Specifically, it is preferable that the difference between the area of the largest one of the four liquid crystal domains A, B, C, and D and the area of the smallest one of the four liquid crystal domains A, B, C, and D be not more than 50% of the largest area. The example shown in FIG. 4 is an example of a quartered structure with the most preferable (i.e. ideal) viewing angle characteristics.

Figure 5:
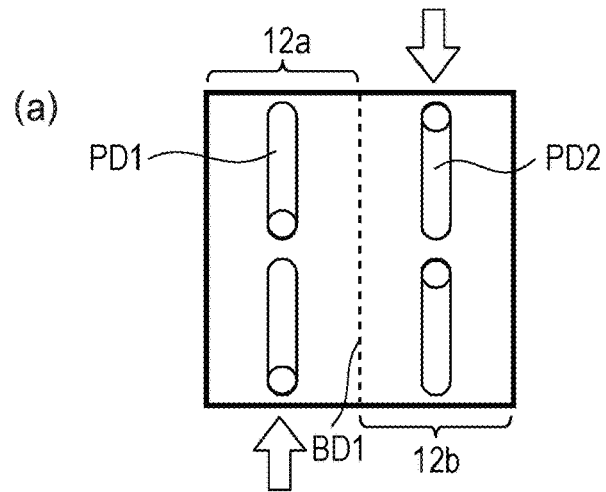
FIG. 5 illustrates diagrams (a), (b), and (c) for explaining a method for obtaining the aligned multi-domain structure of the pixel P shown in FIG. 4.
Figure 5:
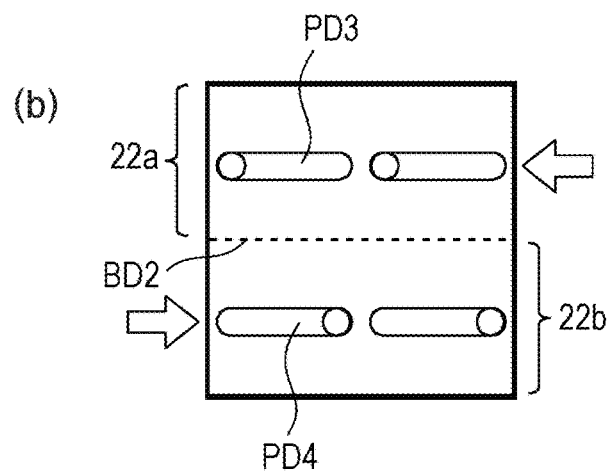
Figure 5:
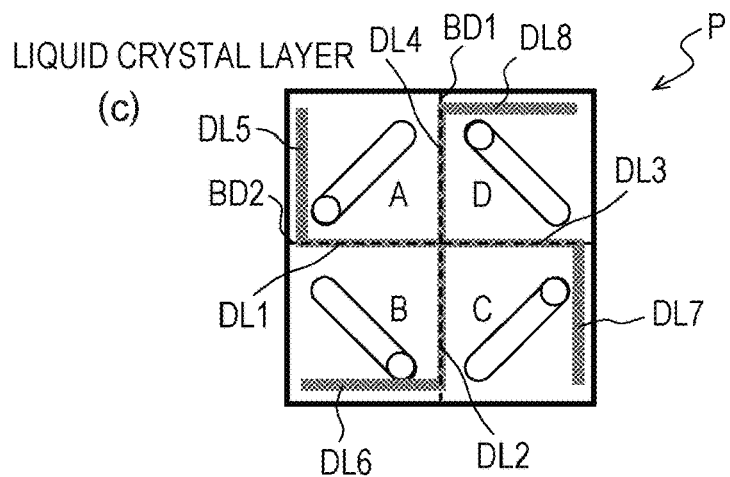

Next, a method for obtaining the aligned multi-domain structure of the pixel P is described with reference to FIGS. 5(a), 5(b), and 5(c). FIG. 5(a) shows pretilt directions PD1 and PD2 that are defined by the first alignment film 12 provided in the active matrix substrate 10, and FIG. 5(b) shows pretilt directions PD3 and PD4 that are defined by the second alignment film 22 provided in the counter substrate 20. Further, FIG. 5(c) shows a tilt direction (director) in the presence of a voltage applied to the liquid crystal layer 30 after the active matrix substrate 10 and the counter substrate 20 have been bonded together.

Within each pixel P, as shown in FIG. 5(a), the first alignment film 12 has a first pretilt region 12a that defines the first pretilt direction PD1 and a second pretilt region 12b that defines the second pretilt direction PD2, which is antiparallel to the first pretilt direction PD1. Specifically, a region of the first alignment film 12 corresponding to one pixel P is halved into right and left parts, and these regions (first and second pretilt regions) 12a and 12b are subjected to alignment treatment so as to define the pretilt directions (first and second pretilt directions) PD1 and PD2 that are antiparallel to each other. Here is applied photo-alignment treatment by oblique irradiation with ultraviolet rays from the directions indicated by the arrows. It should be noted that a boundary BD1 between the first pretilt region 12a and the second pretilt region 12b is hereinafter also called "first pretilt boundary".

Within each pixel P, as shown in FIG. 5(b), the second alignment film 22 has a third pretilt region 22a that defines the third pretilt direction PD3, which is substantially orthogonal to the first pretilt direction PD1 and the second pretilt direction PD2, and a fourth pretilt region 22b that defines the fourth pretilt direction PD4, which is antiparallel to the third pretilt direction PD3. Specifically, a region of the second alignment film 22 corresponding to one pixel P is halved into upper and lower parts, and these regions (third and fourth pretilt regions) 22a and 22b are subjected to alignment treatment so as to define the pretilt directions (third and fourth pretilt directions) PD3 and PD4 that are antiparallel to each other. Here is applied photo-alignment treatment by oblique irradiation with ultraviolet rays from the directions indicated by the arrows. It should be noted that a boundary BD2 between the third pretilt region 22a and the fourth pretilt region 22b is hereinafter also called "second pretilt boundary".

By bonding together the active matrix substrate 10 and the counter substrate 20 subjected to alignment treatment as shown in FIGS. 5(a) and 5(b), respectively, an aligned multi-domain pixel P can be formed as shown in FIG. 5(c). A pretilt direction that is defined by the first alignment film 12 on the side of the active matrix substrate 10 and a pretilt direction that is defined by the second alignment film 22 on the side of the counter substrate 20 differ by substantially 90 degrees from each other in each of the liquid crystal domains A to D, and as can be seen from FIG. 5(c), a tilt direction (reference alignment direction) is defined as a direction intermediate between these two pretilt directions. Further, the first pretilt boundary BD1 and the second pretilt boundary BD2 serve as boundaries between adjacent ones of the four liquid crystal domains A, B, C, and D.

Dark lines DL1 to DL8 appear within the pixel P having the aligned multi-domain structure. Specifically, the dark lines DL1 to DL4 appear at boundaries between adjacent liquid crystal domains, and the dark lines DL5 to DL8 appear in the vicinity of edges of the pixel electrode 11. The liquid crystal display device 100 according to the present embodiment makes it possible to reduce the areas (widths) of the dark lines DL1 to DL4, which appear at the boundaries between adjacent liquid crystal domains.

As already described, the surface of the active matrix substrate 10 that faces the liquid crystal layer 30 has a groove 10g formed within each pixel P. The placement of a groove 10g within each pixel P is described with reference to FIG. 6.

Figure 6:
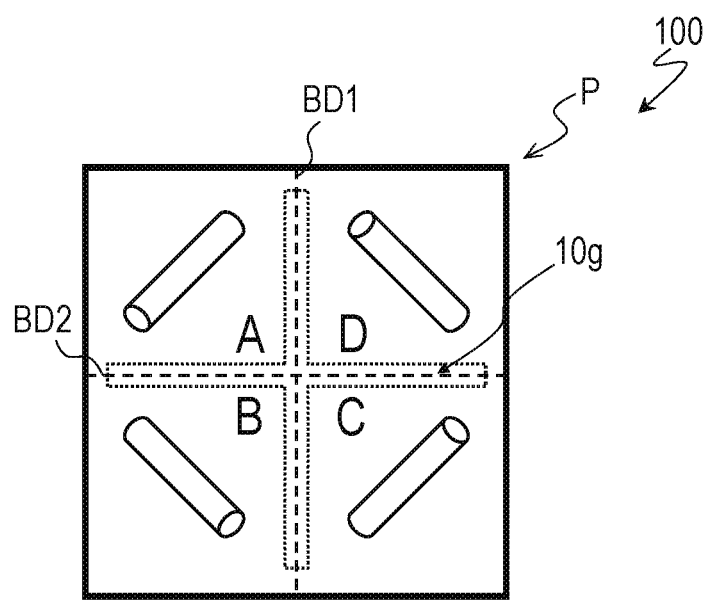
FIG. 6 is a plan view showing the placement within each pixel P of a groove 10g formed in a surface of an active matrix substrate 10.

As shown in FIG. 6, the groove 10g is formed so as to overlap both the first pretilt boundary BD1 and the second pretilt boundary BD2 when seen from a direction normal to the display surface. Accordingly, the groove 10g has a substantially cross shape.

The groove 10g thus placed makes it possible to reduce the areas (widths) of the dark lines DL1 to DL4. The following describes results each obtained from verifying this effect by running an alignment simulation. The simulation involved the use of dedicated liquid crystal simulator software. Calculation conditions for the simulation are shown in Table 1 below.

TABLE 1

| Calculation conditions | | |
| --- | --- | --- |
| Pixel pitch | | 100 μm |
| Relative dielectric constant | ∈// | 8 |
| of liquid crystal material | ∈⊥ | 3 |
| Refractive index of | ne | 1,580 |
| liquid crystal material | no | 1,490 |
| Cell thickness | | 4 μm |
| Voltage applied to liquid crystal layer | | 4.8 V |
| Groove depth | | 0.5 μm |
| Groove width | | 5 μm |

Figure 7:
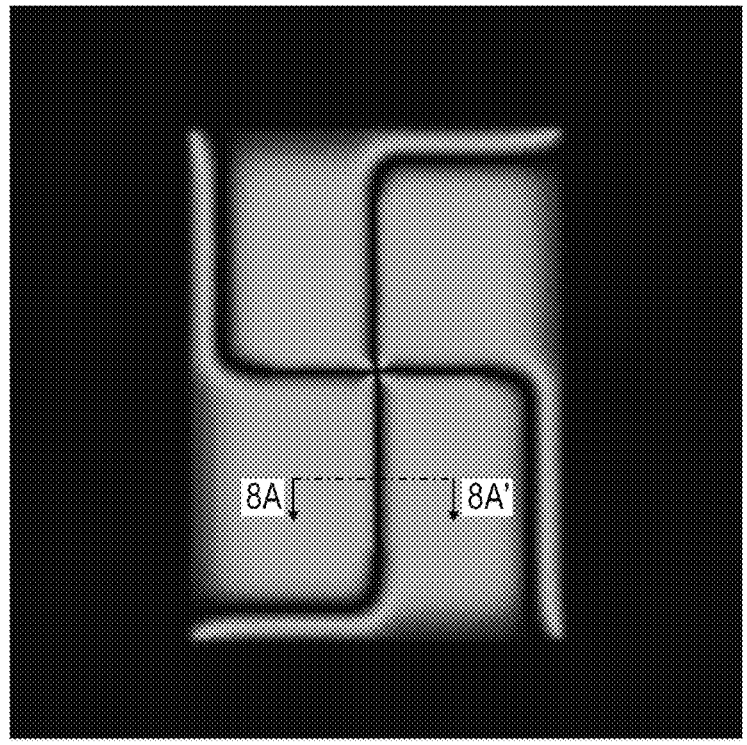
FIG. 7 illustrates diagrams (a) and (b) showing results each obtained from running a simulation of a distribution of transmittance within a pixel during a white display, the diagram (a) showing a result of a case (Example 1) where a groove 10g is formed in the surface of the active matrix substrate 10, the diagram (b) showing a result of a case (Comparative Example) where no such groove 10g is formed.
Figure 7:
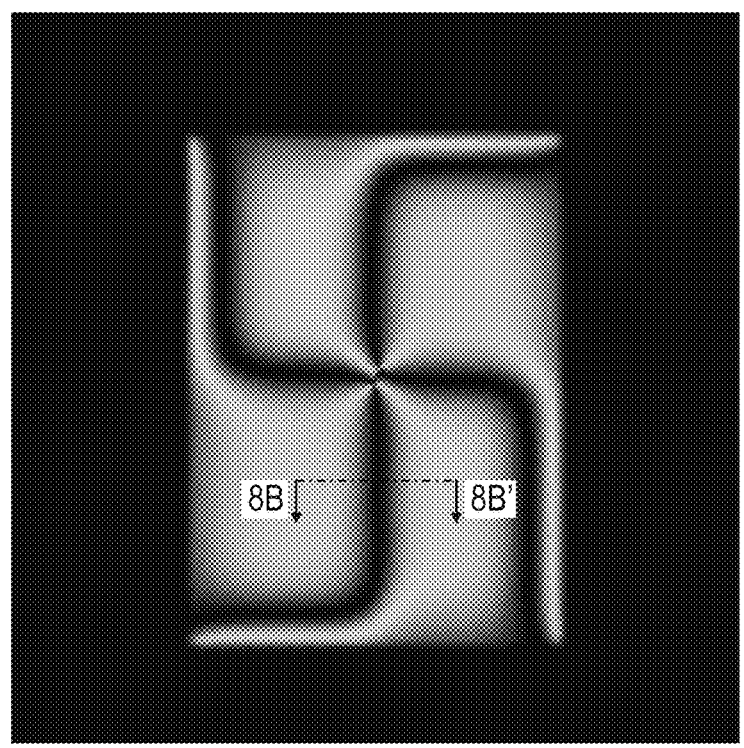

FIGS. 7(a) and 7(b) show results each obtained from running a simulation of a distribution of transmittance within a pixel during a white display. FIG. 7(a) shows a result of a case (Example 1) where a groove 10g is formed in the surface of the active matrix substrate 10 as in the case of the present embodiment, and FIG. 7(b) shows a result of a case (Comparative Example) where no such groove 10g is formed.

A comparison between FIGS. 7(a) and 7(b) shows that the widths of the dark lines DL1 to DL4, which appear at the boundaries between liquid crystal domains, are smaller in Example 1 than in Comparative Example.

Figure 8:
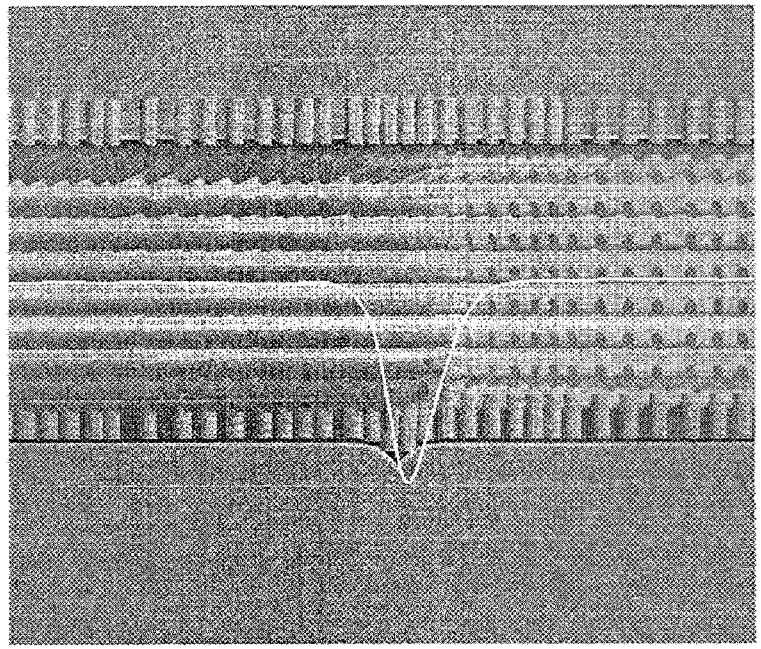
FIG. 8 illustrates diagrams (a) and (b) showing results each obtained from running a simulation of a state of alignment and a profile of luminance (transmittance) within a pixel during a white display, the diagram (a) showing a result of Example 1, the diagram (b) showing a result of Comparative Example.
Figure 8:
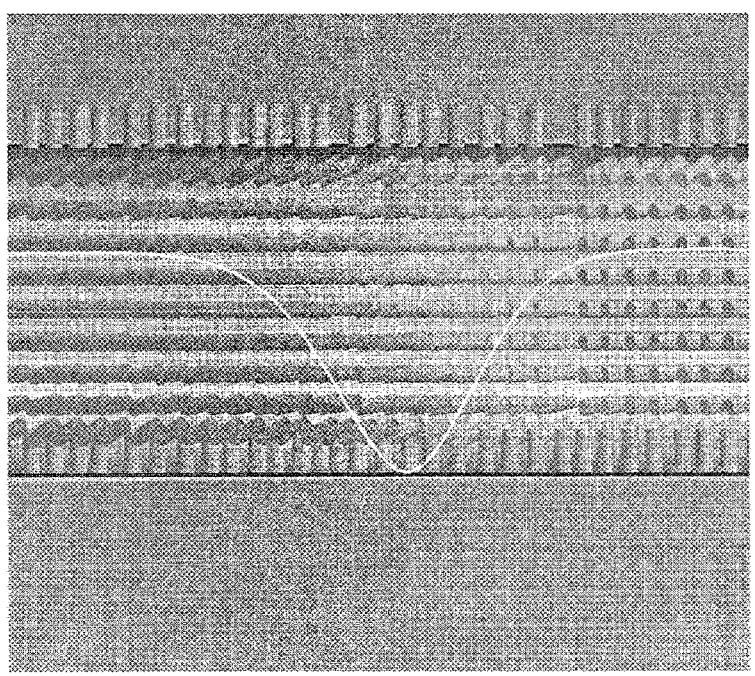

FIGS. 8(a) and 8(b) show results each obtained from running a simulation of a state of alignment and a profile of luminance (transmittance) within a pixel during a white display. FIG. 8(a) shows a result of Example 1, and FIG. 8(b) shows a result of Comparative Example. FIGS. 8(a) and 8(b) correspond to cross-sections taken along lines 8A-8A' and 8B-8B' in FIGS. 7(a) and 7(b), respectively.

In Comparative Example, as shown in FIG. 8(b), the profile of luminance has a comparatively wide depressed portion. On the other hand, in Example 1, as shown in FIG. 8(a), the profile of luminance has a comparatively narrow depressed portion. This too shows that the widths of the dark lines DL1 to DL4 are smaller in Example 1 than in Comparative Example.

Figure 9:
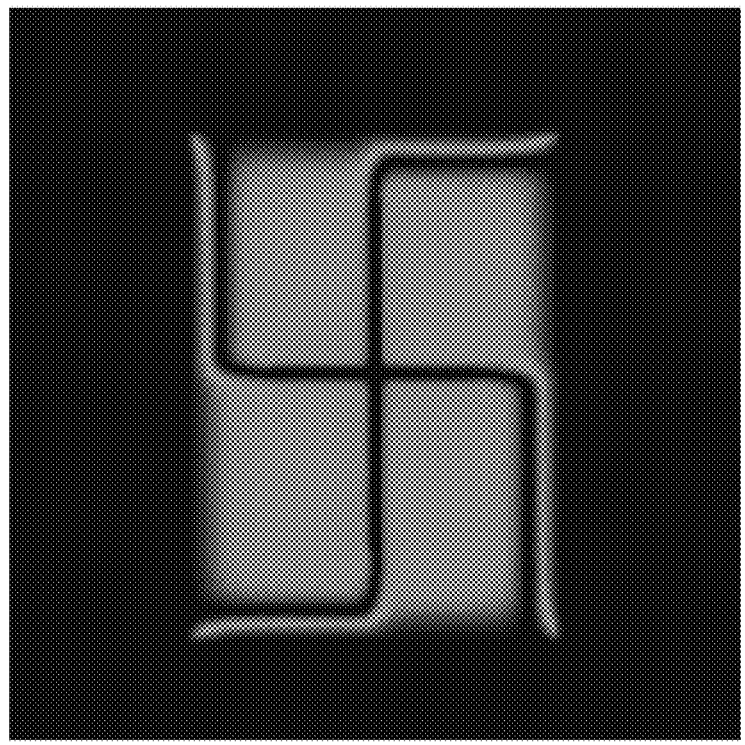
FIG. 9 illustrates diagrams (a) and (b) showing results each obtained from running a simulation of a distribution of transmittance within a pixel during a halftone display, the diagram (a) showing a result of Example 1, the diagram (b) showing a result of Comparative Example.
Figure 9:
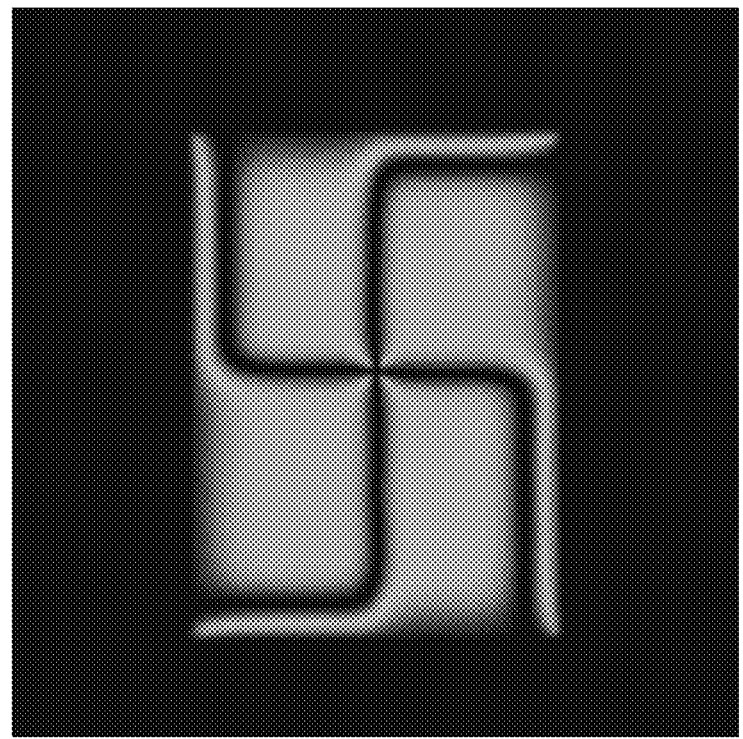

FIGS. 9(a) and 9(b) show results each obtained from running a simulation of a distribution of transmittance within a pixel during a halftone display. FIG. 9(a) shows a result of Example 1, and FIG. 9(b) shows a result of Comparative Example.

A comparison between FIGS. 9(a) and 9(b) shows that during a halftone display, too, the widths of the dark lines DL1 to DL4, which appear at the boundaries between liquid crystal domains, are smaller in Example 1 than in Comparative Example.

Figure 10:
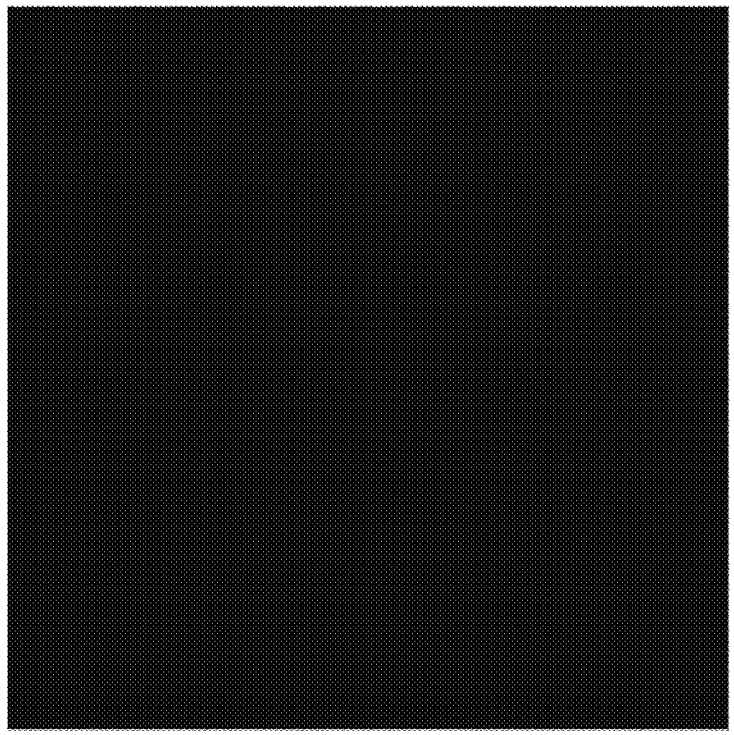
FIG. 10 illustrates diagrams (a) and (b) showing results each obtained from running a simulation of a distribution of transmittance within a pixel during a black display, the diagram (a) showing a result of Example 1, the diagram (b) showing a result of Comparative Example.
Figure 10:
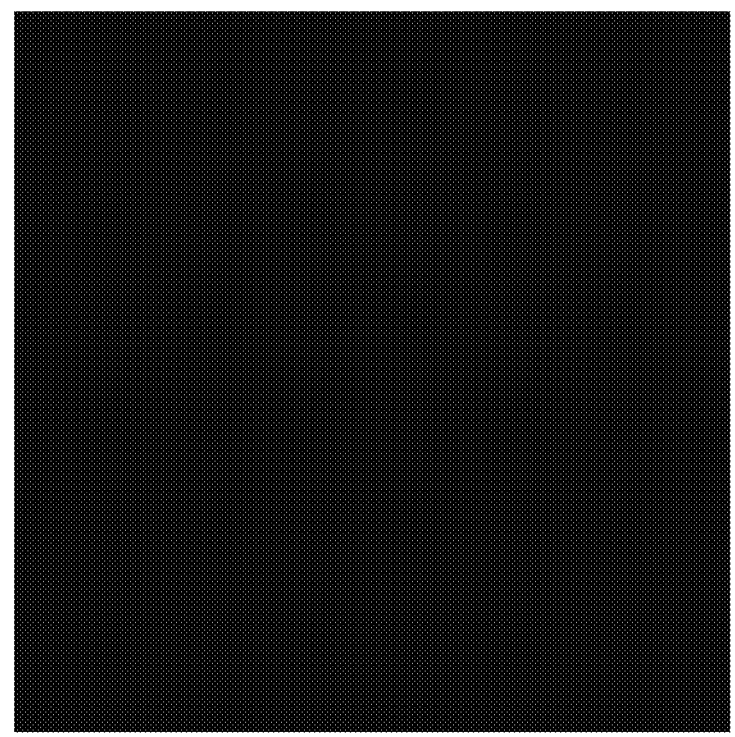

FIGS. 10(a) and 10(b) show results each obtained from running a simulation of a distribution of transmittance within a pixel during a black display. FIG. 10(a) shows a result of Example 1, and FIG. 10(b) shows a result of Comparative Example.

FIGS. 10(a) and 10(b) show that during a black display, Example 1 and Comparative Example show no leakage of light.

Figure 11:
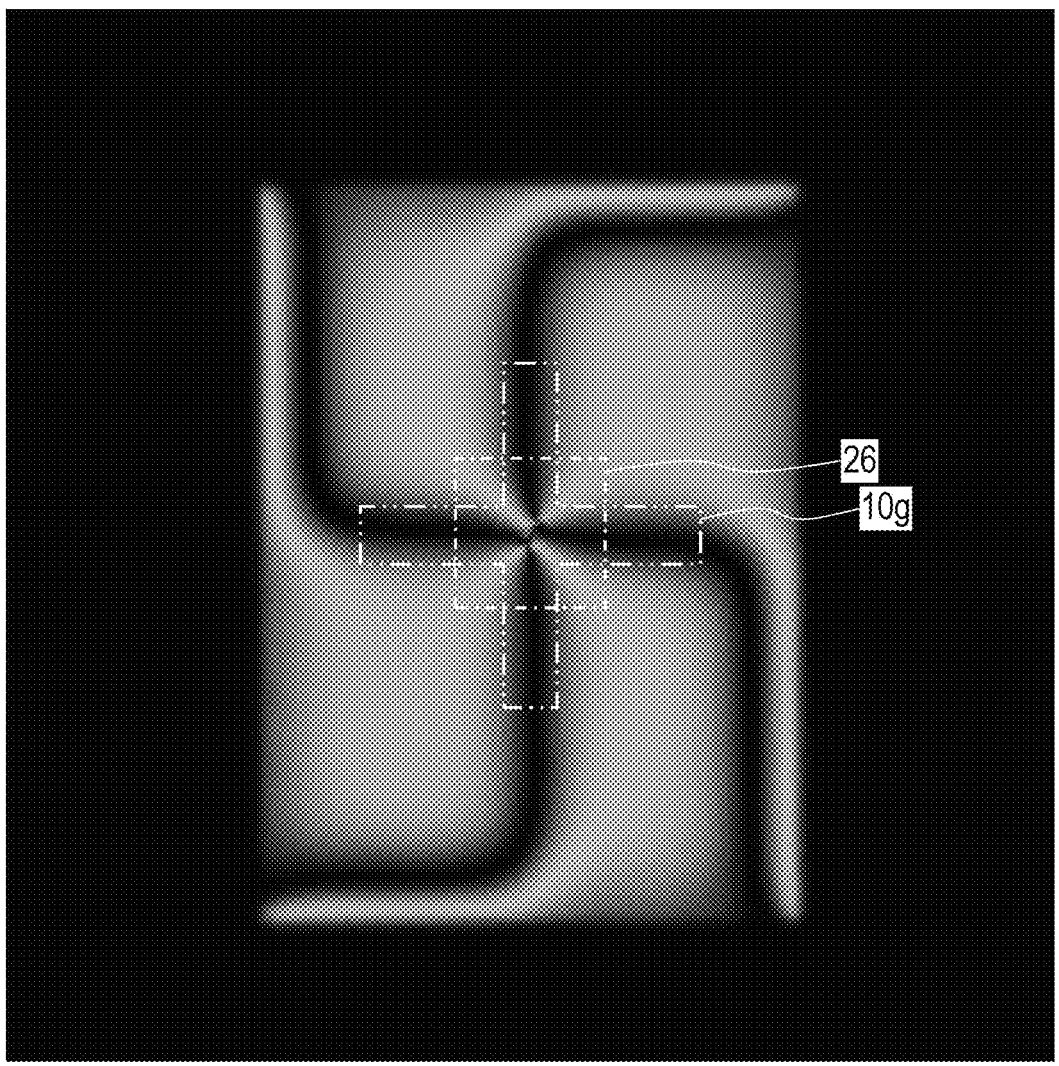
FIG. 11 is a diagram showing the placement of a light-blocking layer 26 during verification of an effect of improvement on transmittance (luminance) by a groove 10g.

Next, a result obtained from verifying an effect of improvement on transmittance (luminance) by a groove 10g is described in consideration of the placement of a light-blocking layer in an actual pixel. FIG. 11 is a diagram showing the placement of a light-blocking layer as taken into consideration during the verification. FIG. 11 uses dot-and-dash lines and chain double-dashed lines to indicate a light-blocking layer 26 placed within a pixel P and the groove 10g. As shown in FIG. 11, the light-blocking layer 26 is placed near the center of the pixel P.

Figure 12:
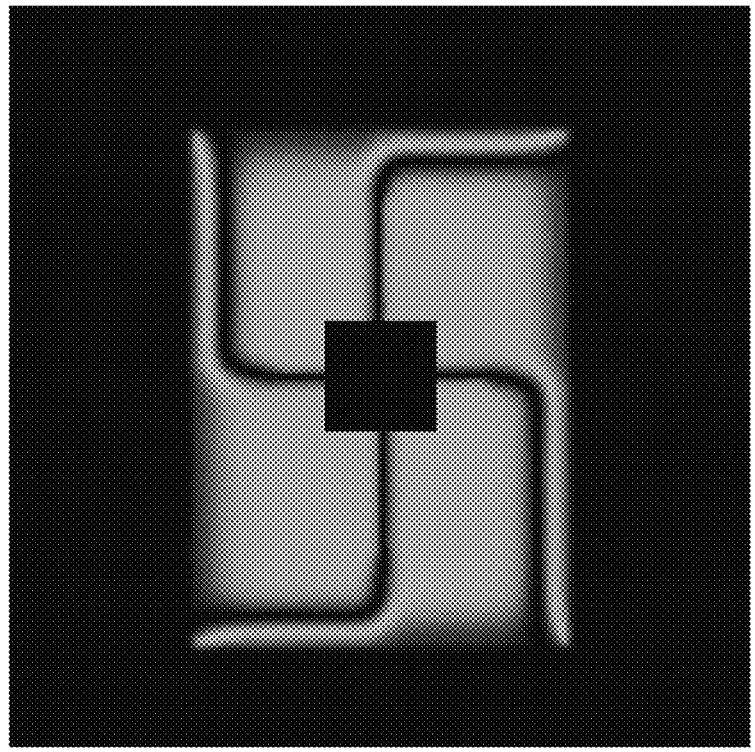
FIG. 12 illustrates diagrams (a) and (b) showing results each obtained from running a simulation of a distribution of transmittance within a pixel during a white display, the diagram (a) showing a result of Example 1, the diagram (b) showing a result of Comparative Example.
Figure 12:
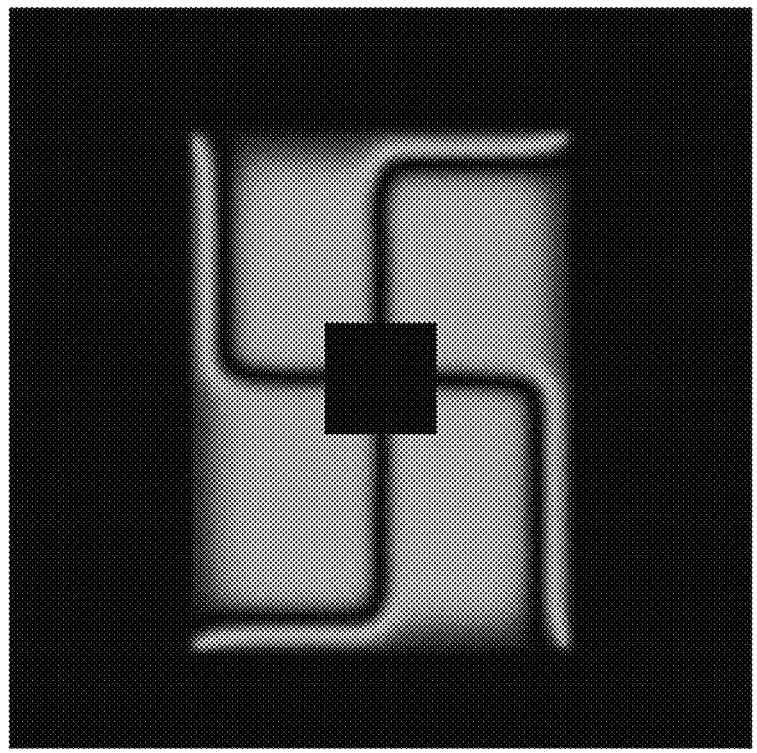

FIGS. 12(a) and 12(b) show results each obtained from running a simulation of a distribution of transmittance within a pixel during a white display. FIG. 12(a) shows a result of Example 1, and FIG. 12(b) shows a result of Comparative Example.

A comparison between FIGS. 12(a) and 12(b) shows that the widths of the dark lines DL1 to DL4, which appear at the boundaries between liquid crystal domains, are smaller in Example 1 than in Comparative Example.

Figure 13:
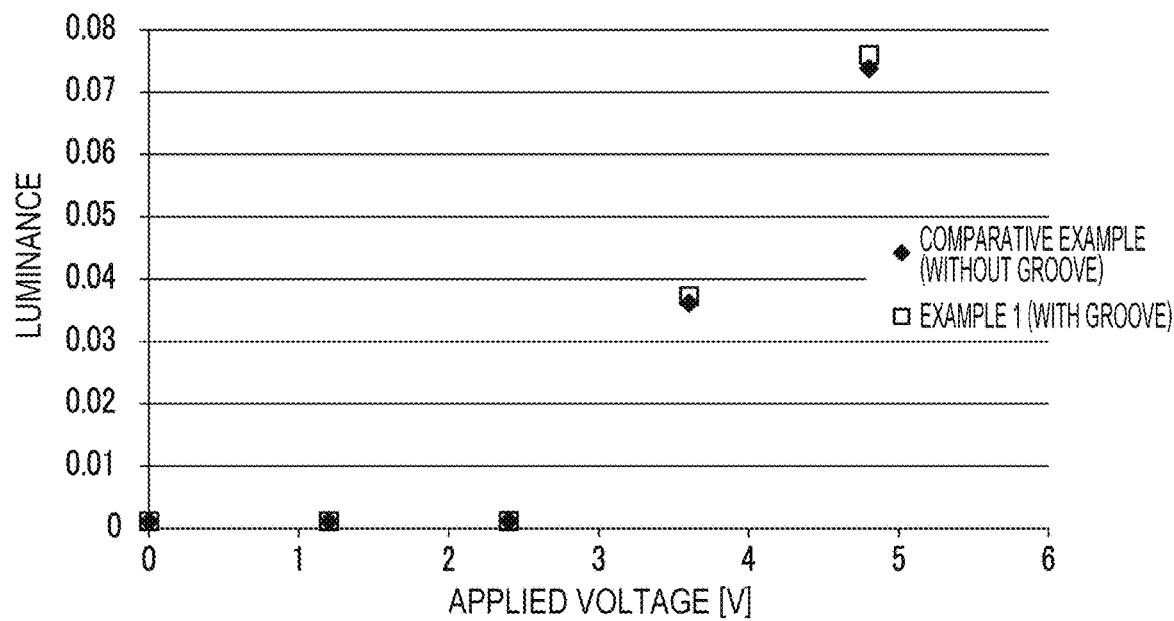
FIG. 13 is a graph showing relationships between applied voltage [V] and luminance in Example 1 and Comparative Example.

Table 2 and FIG. 13 show relationships between applied voltage [V] and luminance in Example 1 and Comparative Example.

TABLE 2

| | Luminance | | Luminance ratio |
| --- | --- | --- | --- |
| Applied voltage [V] | Comparative Example (without groove) | Example 1 (with groove) | (Example 1/ Comparative Example) |
| 0 | 0.001197 | 0.00119674 | 0.999649816 |
| 1.2 | 0.001197 | 0.00119676 | 0.999649745 |
| 2.4 | 0.001222 | 0.00122091 | 0.999324153 |
| 3.6 | 0.036201 | 0.03733173 | 1.031230191 |
| 4.8 | 0.073841 | 0.07601286 | 1.029410627 |

Table 2 and FIG. 13 show that in a white display state (applied voltage: 4.8 V) and a high-level halftone display state (applied voltage: 3.6 V), Example 1 shows more improved luminance (transmittance) than Comparative Example. Further, Table 2 and FIG. 13 also show that in a black display state (applied voltage: 0 V) and a low-level halftone display state (applied voltage: 1.2 V, 2.4 V), Example 1 shows no leakage of light (decrease in contrast ratio).

Next, a consideration by the inventor of the present invention of a reason why the areas of the dark lines DL1 to DL4 are reduced by the formation of a groove 10g in the surface of the active matrix substrate 10 is described.

Figure 14:
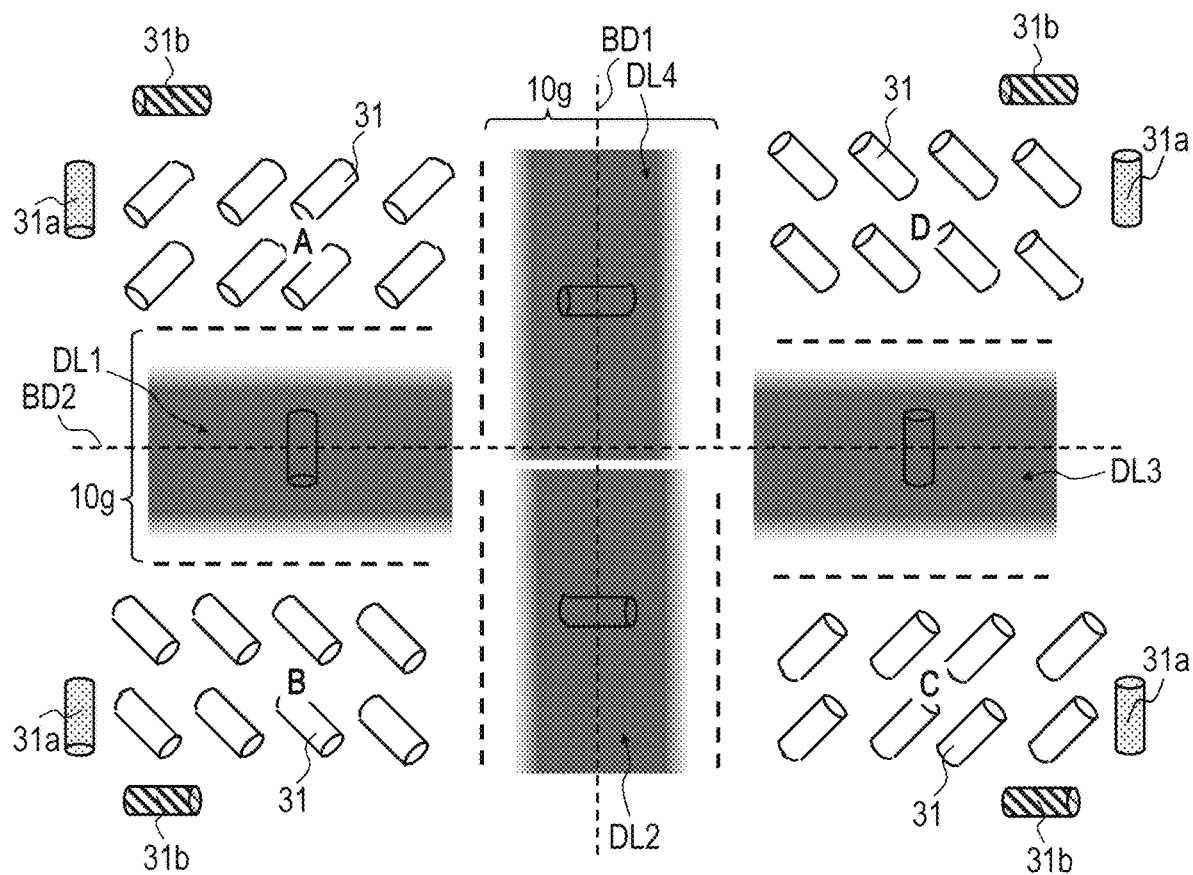
FIG. 14 is a diagram showing states of alignment of liquid crystal molecules 31 in liquid crystal domains A to D and dark lines DL1 to DL4.

FIG. 14 shows states of alignment of liquid crystal molecules 31 in the liquid crystal domains A to D and the dark lines DL1 to DL4. FIG. 14 also shows directions of alignment of liquid crystal molecules 31a in the vicinity of the surface of the active matrix substrate 10 and directions of alignment of liquid crystal molecules 31b in the vicinity of the surface of the counter substrate 20.

As shown in FIG. 14, at a boundary between two adjacent liquid crystal domains, liquid crystal molecules 31 are aligned in a direction intermediate between the tilt directions of those liquid crystal domains. Specifically, a liquid crystal molecule 31 is aligned in a substantially 270-degree direction at the boundary between the liquid crystal domain A and the liquid crystal domain B, and a liquid crystal molecule 31 is aligned in a substantially 0-degree direction at the boundary between the liquid crystal domain B and the liquid crystal domain C. Further, a liquid crystal molecule 31 is aligned in a substantially 90-degree direction at the boundary between the liquid crystal domain C and the liquid crystal domain D, and a liquid crystal molecule 31 is aligned in a substantially 180-degree direction at the boundary between the liquid crystal domain D and the liquid crystal domain A. Such alignment of the liquid crystal molecules 31 causes the dark lines DL1 to DL4 to appear.

Figure 15:
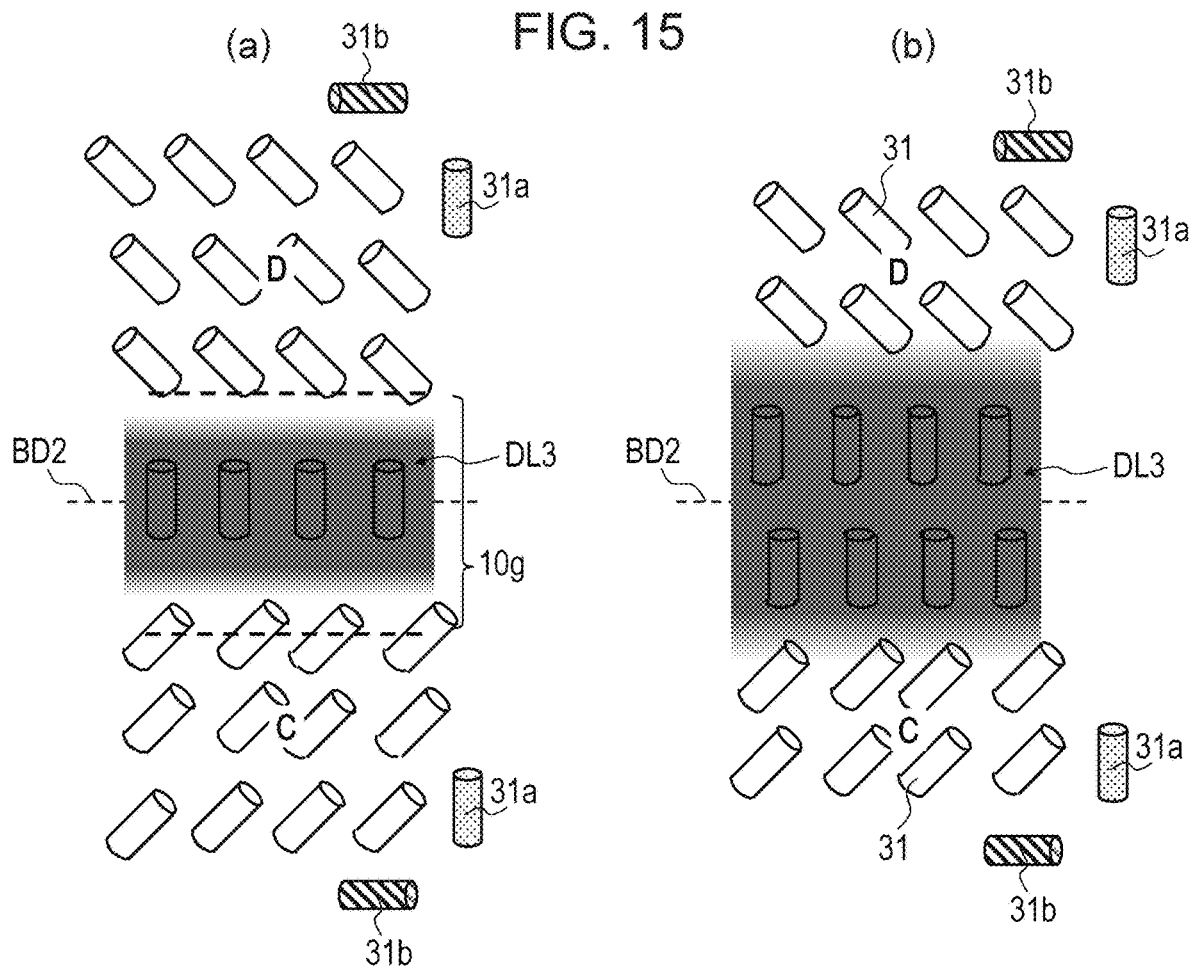
FIG. 15 illustrates diagrams (a) and (b) showing states of alignment of liquid crystal molecules 31 in the liquid crystal domains C and D and the dark line DL3, the diagram (a) showing a case where a groove 10g is formed in the surface of the active matrix substrate 10, the diagram (b) showing a case where no such groove 10g is formed.

FIGS. 15(a) and 15(b) show states of alignment of liquid crystal molecules 31 in the liquid crystal domains C and D and the dark line DL3. FIG. 15(a) shows a case where a groove 10g is formed in the surface of the active matrix substrate 10, and FIG. 15(b) shows a case where no such groove 10g is formed.

In a case where a groove 10g is formed, as shown in FIG. 15(a), the region where liquid crystal molecules 31 are aligned substantially parallel to the vertical direction on the display surface is narrow. Therefore, the width of the dark line DL3 is small.

On the other hand, in a case where no groove 10g is formed, as shown in FIG. 15(b), the region where liquid crystal molecules 31 are aligned substantially parallel to the vertical direction on the display surface is wide. Therefore, the width of the dark line DL3 is great.

Figure 16:
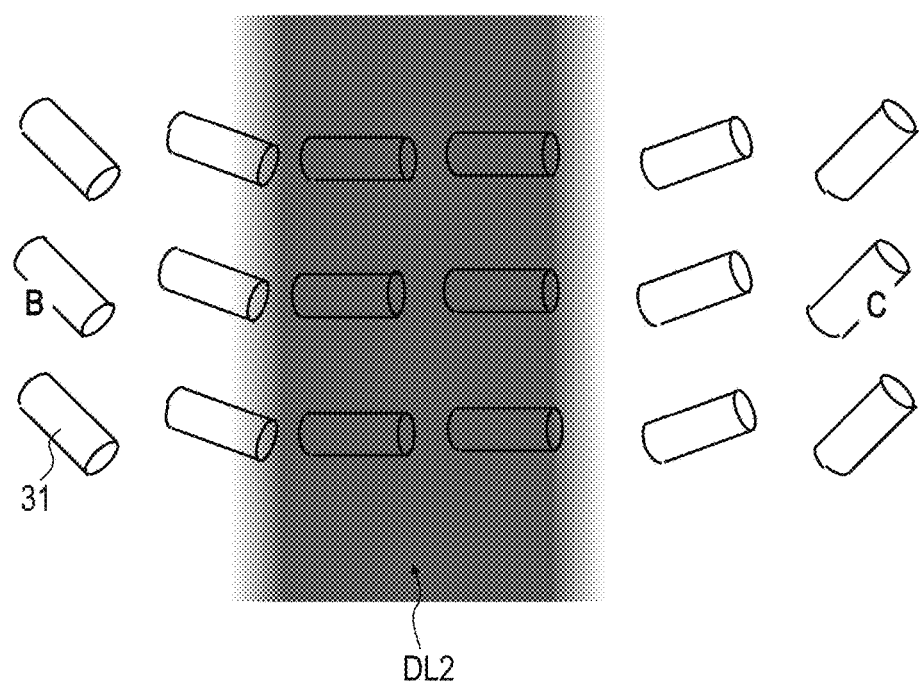
FIG. 16 is a diagram showing a state of alignment of liquid crystal molecules 31 in the vicinity of a boundary between the liquid crystal domain B and the liquid crystal domain C in a case where no groove 10g is formed.

The following explains a reason why the widths of the dark lines DL1 to DL4 vary according to the presence or absence of a groove 10g. In the absence of a groove 10g, there is a gradual change in direction of alignment between two adjacent liquid crystal domains. For example, as shown in FIG. 16, liquid crystal molecules 31 gradually change from a substantially 315-degree direction to a substantially 45-degree direction in the vicinity of the boundary between the liquid crystal domain B and the liquid crystal domain C. Therefore, the width of the dark line DL2 is wide.

Figure 17:
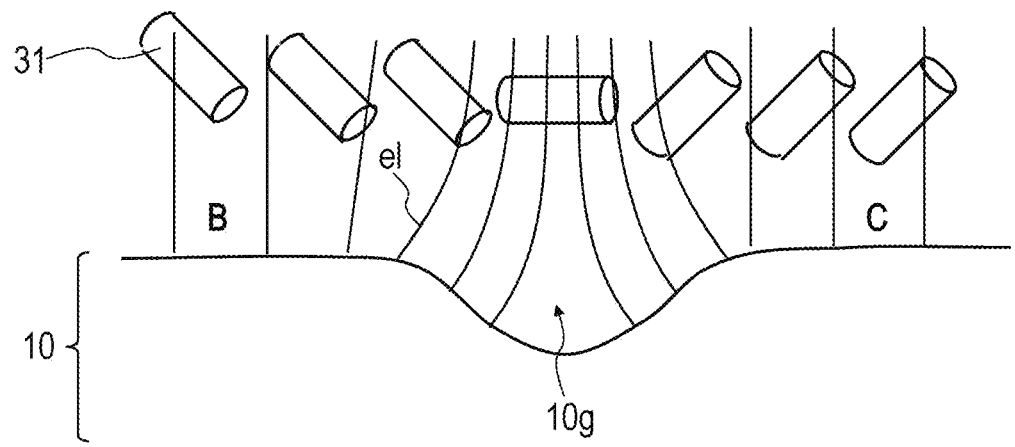
FIG. 17 illustrates diagrams (a) and (b) showing a state of alignment of liquid crystal molecules 31 in the vicinity of the boundary between the liquid crystal domain B and the liquid crystal domain C in a case where a groove 10g is formed.
Figure 17:
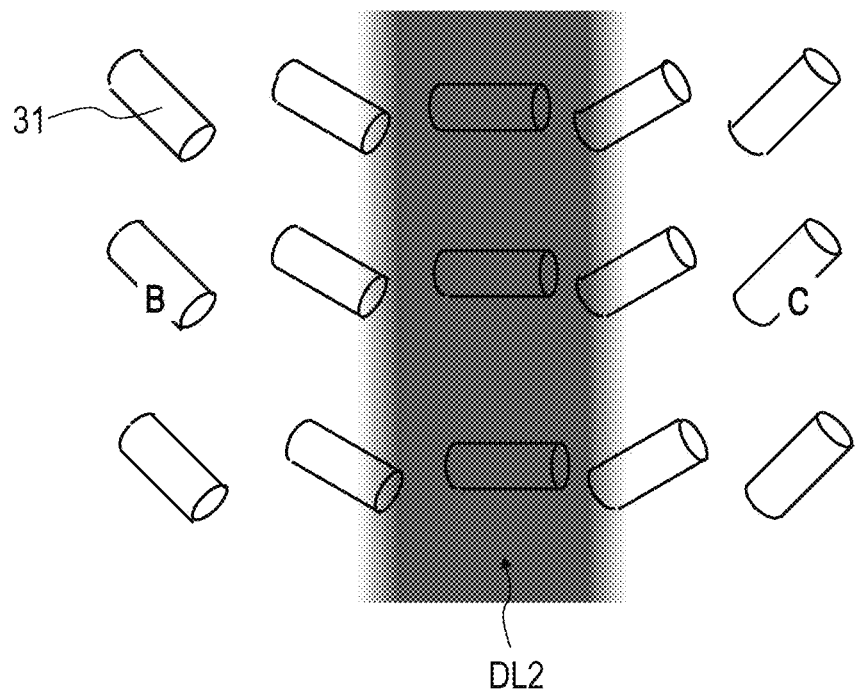

On the other hand, in the presence of a groove 10g, as shown in FIG. 17(a), there is a stronger electric field in the vicinity of an edge of the groove 10g (as indicated by liquid crystal molecules 31 and lines of electric force e1 in the vicinity of the active matrix substrate 10 in FIG. 17(a)), the liquid crystal molecules 31 are subjected to a stronger alignment-regulating force over the groove 10g. Therefore, more liquid crystal molecules 31 become aligned in a desired tilt direction (or a direction close to the desired direction). As a result, it is considered that the width of the dark line DL2 becomes smaller as shown in FIG. 17(b).

Next, a method for manufacturing a liquid crystal display device 100 according to the present embodiment is described.

First, an active matrix substrate 10 including a first alignment film 12 is prepared. This step may be executed by a technique which is similar to that which is used to fabricate an active matrix substrate for use in a common 4D-RTN mode. Note, however, that the step of forming an organic insulating layer 8 is executed so that the organic insulating layer 8 has a depressed portion 8a. The depressed portion 8a of the organic insulating layer 8 defines a groove 10g in a surface of the active matrix substrate 10.

It is preferable that the depth of the depressed portion 8a (which substantially corresponds to the depth of the groove 10g) be not less than 0.3 µm. If the depth of the depressed portion 8a is less than 0.3 µm, a sufficiently strong alignment-regulating force is not attained, with the possible result that the effect of improvement on transmittance may be small. The width of the depressed portion 8a is for example not less than 4.5 µm and not greater than 8 µm.

In a case where the organic insulating layer 8 is made of a photosensitive resin material, the depressed portion 8a can be formed, for example, by exposure with a gray-tone mask. The gray-tone mask has a fine slit of a size equal to or smaller than the resolution of an exposure device and therefore makes it possible to achieve three levels of exposure, namely "exposed portion", "intermediate exposed portion", and "unexposed portion", in a single exposure. This makes it possible simultaneously form, in the organic insulating layer 8, an opening that constitutes a contact hole CH and the depressed portion 8a.

Figure 18:
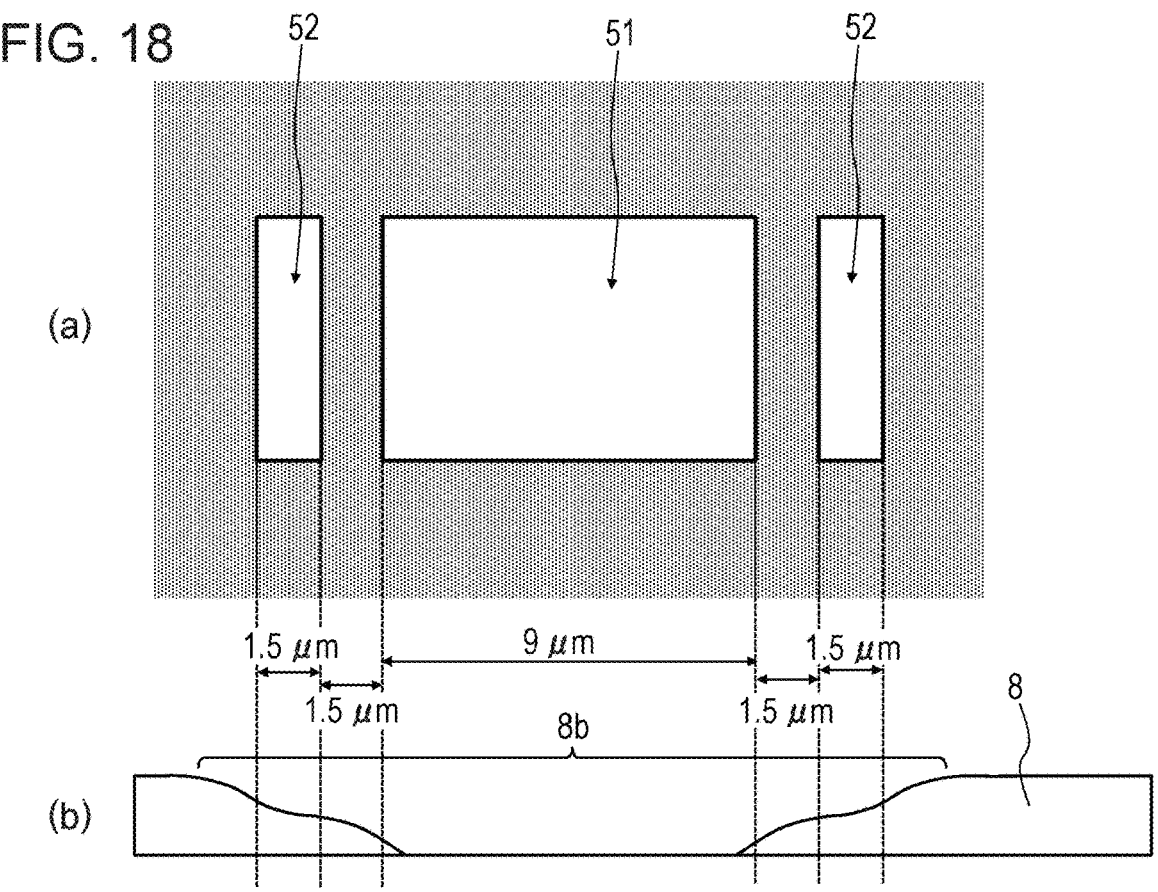
FIG. 18 illustrates a plan view (a) showing a slit pattern for forming an opening that constitutes a contact hole CH and a cross-sectional view (b) showing an opening 8b formed in an organic insulating layer 8 by the slit pattern shown in the plan view (a).
Figure 19:
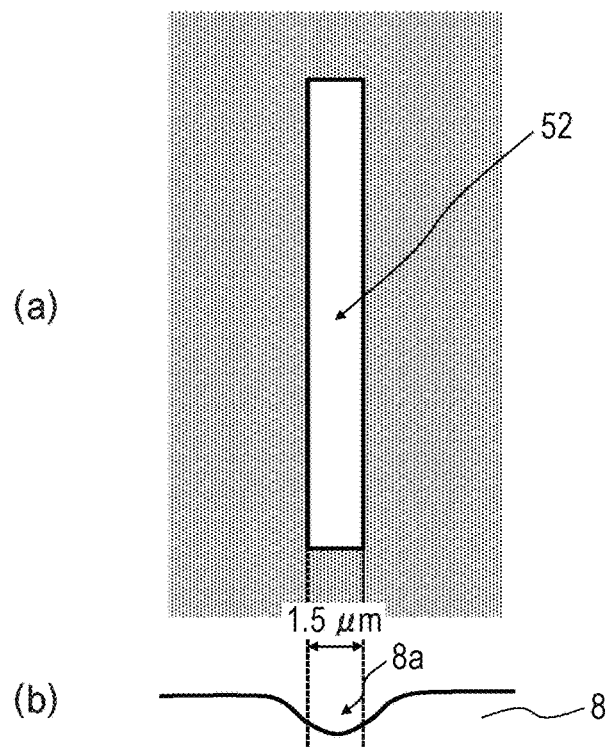
FIG. 19 illustrates a plan view (a) showing a slit pattern for forming a depressed portion 8a and a cross-sectional view (b) showing a depressed portion 8a formed in the organic insulating layer 8 by the slit pattern shown in the plan view (a).
Figure 20:
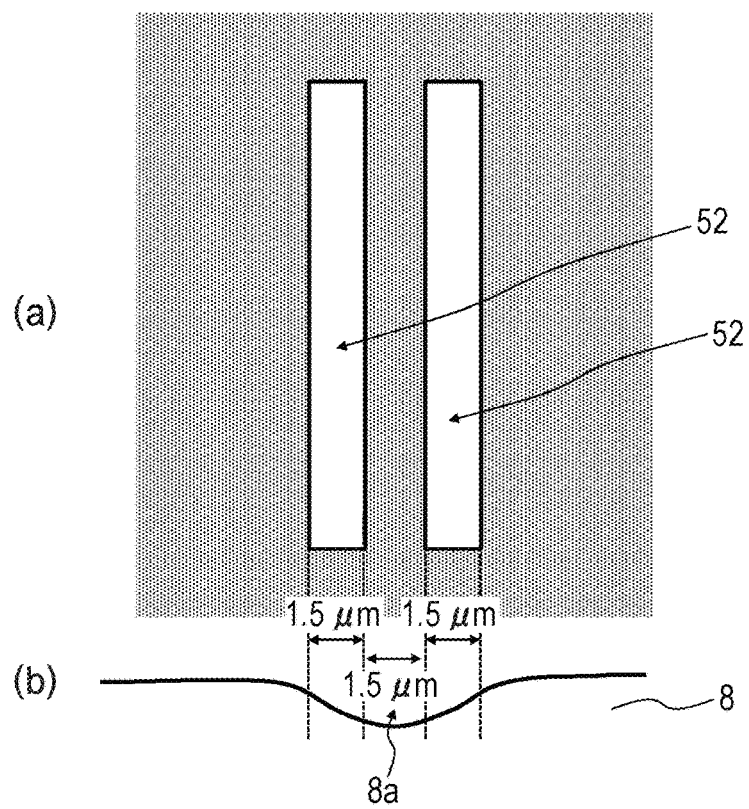
FIG. 20 illustrates a plan view (a) showing a slit pattern for forming a depressed portion 8a and a cross-sectional view (b) showing a depressed portion 8a formed in the organic insulating layer 8 by the slit pattern shown in the plan view (a).

Examples of slit patterns of gray-tone masks are described here with reference to FIGS. 18, 19, and 20.

FIG. 18(a) shows a slit pattern for forming an opening that constitutes a contact hole CH, and FIG. 18(b) shows an opening 8b formed in the organic insulating layer 8 by the slit pattern shown in FIG. 18(a).

The slit pattern shown in FIG. 18(a) includes a slit 51 and two fine slits 52 placed on both sides, respectively, of the slit 51. The width of the slit 51 is for example 9 µm, and the width of each of the fine slits 52 is for example 1.5 µm. The spacing between the slit 51 and each of the fine slits 52 is for example 1.5 µm. Using a gray-tone mask having the slit pattern shown in FIG. 18(a) makes it possible to form, in the organic insulating layer 8, an opening 8b such as that shown in FIG. 18(b).

Alternatively, the opening 8b can be formed by a slit pattern including no fine slits 52. Forming the opening 8b with a slit pattern including fine slits 52 allows the opening 8b to have comparatively gently tapered side surfaces.

FIG. 19(a) shows a slit pattern for forming a depressed portion 8a, and FIG. 19(b) shows a depressed portion 8a formed in the organic insulating layer 8 by the slit pattern of FIG. 19(a).

The slit pattern shown in FIG. 19(a) includes a fine slit 52. The width of the fine slit 52 is for example 1.5 µm. Using a gray-tone mask having a slit pattern such as that shown in FIG. 19(a) makes it possible to form, in the organic insulating layer 8, a depressed portion 8a such as that shown in FIG. 19(b).

FIG. 20(a) shows another slit pattern for forming a depressed portion 8a, and FIG. 20(b) shows a depressed portion 8a formed in the organic insulating layer 8 by the slit pattern of FIG. 20(a).

The slit pattern shown in FIG. 20(a) includes two fine slits 52. The width of each of the fine slits 52 is for example 1.5 µm. The spacing between the two fine slits 52 is for example 1.5 µm. Using a gray-tone mask having a slit pattern such as that shown in FIG. 20(a) makes it possible to form, in the organic insulating layer 8, a depressed portion 8a such as that shown in FIG. 20(b).

Although a gray-tone mask is used in each of the cases illustrated here, this is not the only technique for forming a depressed portion 8a in the organic insulating layer 8. For example, a halftone mask may be used.

Next, within a region of the first alignment film 12 corresponding to each of a plurality of pixels P, a first pretilt region 12a that defines a first pretilt direction PD1 and a second pretilt region 12b that defines a second pretilt direction PD2 that is antiparallel to the first pretilt direction PD1 are formed by photo-alignment treatment. This step includes the step of irradiating a portion of the first alignment film 12 that is to become the first pretilt region 12a with light in a state where a portion of the first alignment film 12 that is to become the second pretilt region 12b is shielded from light by a photomask and the subsequent step of irradiating the portion of the first alignment film 12 that is to become the second pretilt region 12b with light in a state where the portion of the first alignment film 12 that is to become the first pretilt region 12a is shielded from light by a photomask. It should be noted that the step of irradiating the portion that is to become the second pretilt region 12b with light may of course precede the step of irradiating the portion that is to become the first pretilt region 12a with light.

Meanwhile, a counter substrate 20 including a second alignment film 22 is prepared separately from the active matrix substrate 10. This step may be executed by a technique which is similar to that which is used to fabricate a counter substrate for use in a common 4D-RTN mode.

Next, within a region of the second alignment film 22 corresponding to each of the plurality of pixels P, a third pretilt region 22a that defines a third pretilt direction PD3 and a fourth pretilt region 22b that defines a fourth pretilt direction PD4 that is antiparallel to the third pretilt direction PD3 are formed by photo-alignment treatment. This step includes the step of irradiating a portion of the second alignment film 22 that is to become the third pretilt region 22a with light in a state where a portion of the second alignment film 22 that is to become the fourth pretilt region 22b is shielded from light by a photomask and the subsequent step of irradiating the portion of the second alignment film 22 that is to become the fourth pretilt region 22b with light in a state where the portion of the second alignment film 22 that is to become the third pretilt region 22a is shielded from light by a photomask. It should be noted that the step of irradiating the portion that is to become the fourth pretilt region 22b with light may of course precede the step of irradiating the portion that is to become the third pretilt region 22a with light.

After that, the active matrix substrate 10 with the first pretilt region 12a and the second pretilt region 12b formed in the first alignment film 12 and the counter substrate 20 with the third pretilt region 22a and the fourth pretilt region 22b formed in the second alignment film 22 are bonded together.

Then, a liquid crystal layer 30 is formed by injecting a liquid crystal material into the space between the active matrix substrate 10 and the counter substrate 20, for example, by using a vacuum injection method. It should be noted that the liquid crystal layer 30 may of course be formed by a falling-drop method (i.e. by applying a liquid crystal material onto one of the substrates before bonding).

After that, a liquid crystal display device 100 according to the present embodiment is obtained by executing the step of bonding a pair of polarizing plates 41 and 42 to outer sides of the active matrix substrate 10 and the counter substrate 20, respectively, and similar steps.

Embodiment 2

Figure 21:
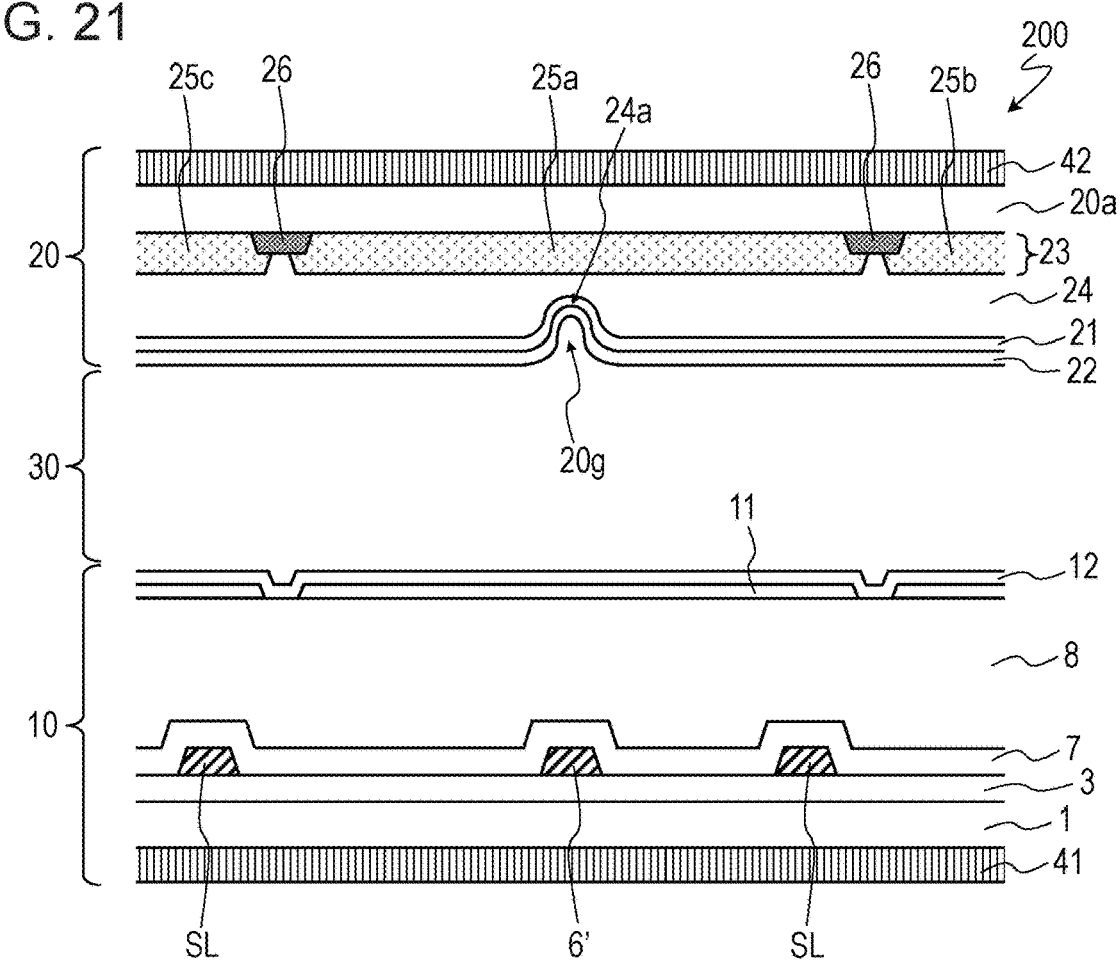
FIG. 21 is a cross-sectional view schematically showing a liquid crystal display device 200 according to an embodiment of the present invention.
Figure 22:
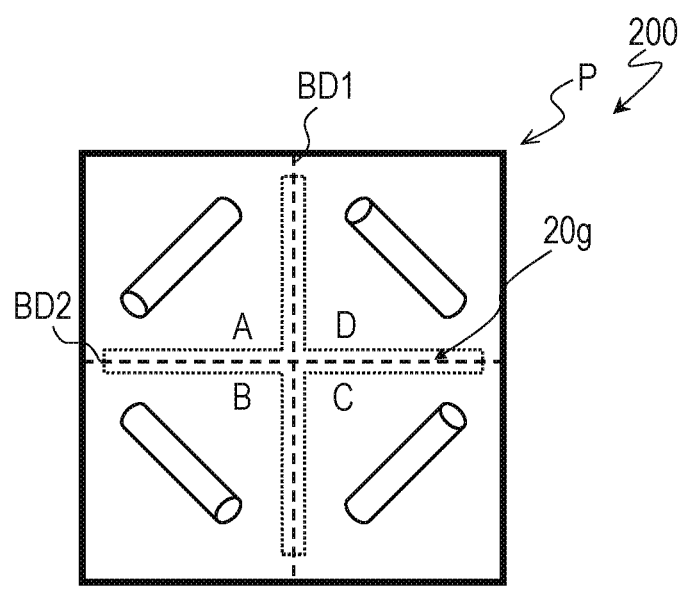
FIG. 22 is a plan view showing the placement of a groove 20g within a pixel P of the liquid crystal display device 200.

A liquid crystal display device 200 according to the present embodiment is described with reference to FIGS. 21 and 22. FIG. 21 is a cross-sectional view schematically showing the liquid crystal display device 200, and shows a cross-section corresponding to the cross-section of the liquid crystal display device 100 according to Embodiment 1 as shown in FIG. 3. FIG. 22 is a diagram showing the placement of a groove 20g within a pixel P of the liquid crystal display device 200. The following mainly describes where the liquid crystal display device 200 is different from the liquid crystal display device 100 according to Embodiment 1.

In the liquid crystal display device 200 according to the present embodiment, as shown in FIG. 21, the surface of the counter substrate 20 that faces the liquid crystal layer 30 has a groove 20g within each pixel P. In the configuration illustrated, the groove 20g is defined by a depressed portion 24a formed in the planarizing layer (overcoat layer) 24. The counter electrode 21 and the second alignment film 22, which are located above the planarizing layer 24, have depressions in regions corresponding to the groove 20g (that is, the counter electrode 21 and the second alignment film 22 have their surfaces shaped in conformance with the shape of the depressed portion 24a of the planarizing layer 24).

As shown in FIG. 22, the groove 20g is formed so as to overlap both the first pretilt boundary (boundary between the first pretilt region 12a and the second pretilt region 12b) BD1 and the second pretilt boundary (boundary between the third pretilt region 22a and the fourth pretilt region 22b) BD2 when seen from the direction normal to the display surface. Accordingly, the groove 20g has a substantially cross shape.

With the groove 20g thus placed, the liquid crystal display device 200 makes it possible to reduce the areas (widths) of the dark lines DL1 to DL4, as is the case with the liquid crystal display device 100 according to Embodiment 1.

It is preferable that the depth of the depressed portion 24a of the planarizing layer 24 (which substantially corresponds to the depth of the groove 20g) be not less than 0.3 µm, as is the case with the depressed portion 8a of the organic insulating layer 8. The width of the depressed portion 24a is for example not less than 4.5 µm and not greater than 8 µm. In a case where the planarizing layer 24 is made of a photosensitive resin material, the depressed portion 24a can be formed, for example, by exposure with a gray-tone mask.

Embodiment 3

Figure 23:
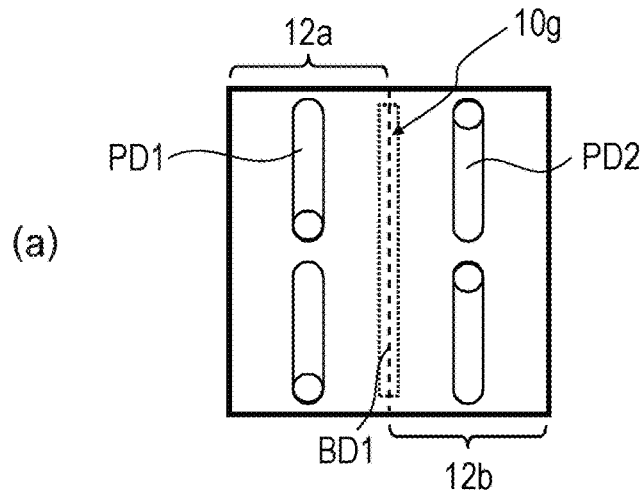
FIG. 23 illustrates a plan view (a) showing the placement of a groove 10g formed in a surface of an active matrix substrate 10 of a liquid crystal display device 300 according to an embodiment of the present invention, a plan view (b) showing the placement of a groove 20g formed in a surface of a counter substrate 20 of the liquid crystal display device 300, and a plan view (c) showing the placement of the grooves 10g and 20g in combination.
Figure 23:
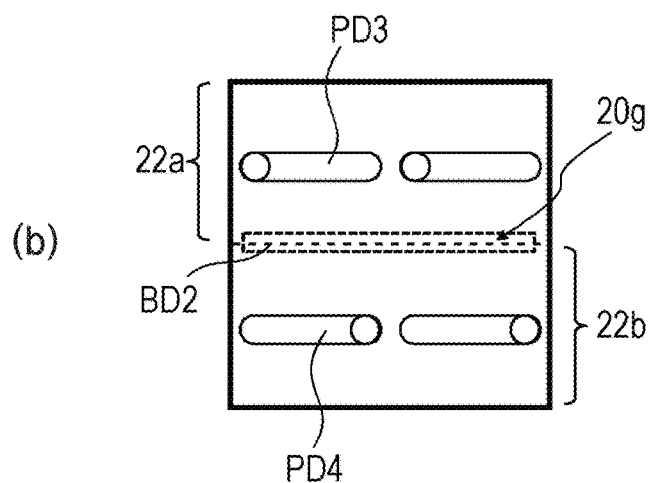
Figure 23:
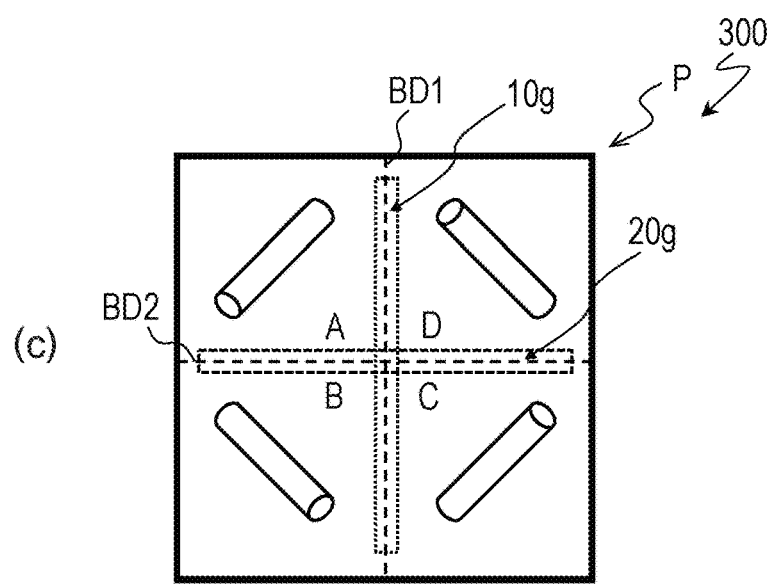

A liquid crystal display device 300 according to the present embodiment is described with reference to FIG. 23. FIG. 23(a) is a diagram showing the placement of a groove 10g formed in a surface of an active matrix substrate 10 of the liquid crystal display device 300, and FIG. 23(b) is a diagram showing the placement of a groove 20g formed in a surface of a counter substrate 20 of the liquid crystal display device 300. FIG. 23(c) is a diagram showing the placement of the grooves 10g and 20g in combination.

In the liquid crystal display device 300 according to the present embodiment, as shown in FIGS. 23(a), 23(b), and 23(c), the surface of the active matrix substrate 10 that faces the liquid crystal layer 30 has a groove 10g in each pixel P, and the surface of the counter substrate 20 that faces the liquid crystal layer 30 has a groove 20g in each pixel P.

As shown in FIGS. 23(a) and 23(c), the groove 10g on the side of the active matrix substrate 10 is formed so as to overlap the first pretilt boundary (boundary between the first pretilt region 12a and the second pretilt region 12b) BD1 when seen from the direction normal to the display surface. Accordingly, the groove 10g has a substantially linear shape that extends in a vertical direction. Although not illustrated here, the groove 10g is defined, for example, by a depressed portion 8a formed in the organic insulating layer 8.

As shown in FIGS. 23(b) and 23(c), the groove 20g on the side of the counter substrate 20 is formed so as to overlap the second pretilt boundary (boundary between the third pretilt region 22a and the fourth pretilt region 22b) BD2 when seen from the direction normal to the display surface. Accordingly, the groove 20g has a substantially linear shape that extends in a horizontal direction. Although not illustrated here, the groove 20g is defined, for example, by a depressed portion 24a formed in the planarizing layer (overcoat layer) 24.

With the grooves 10g and 20g thus placed, the liquid crystal display device 300 makes it possible to reduce the areas (widths) of the dark lines DL1 to DL4, as is the case with the liquid crystal display device 100 according to Embodiment 1 and the like.

Embodiment 4

Figure 24:
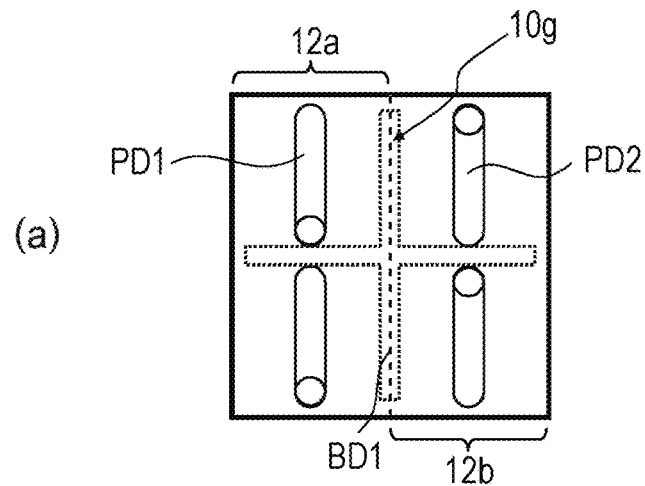
FIG. 24 illustrates a plan view (a) showing the placement of a groove 10g formed in a surface of an active matrix substrate 10 of a liquid crystal display device 400 according to an embodiment of the present invention, a plan view (b) showing the placement of a groove 20g formed in a surface of a counter substrate 20 of the liquid crystal display device 400, and a plan view (c) showing the placement of the grooves 10g and 20g in combination.
Figure 24:
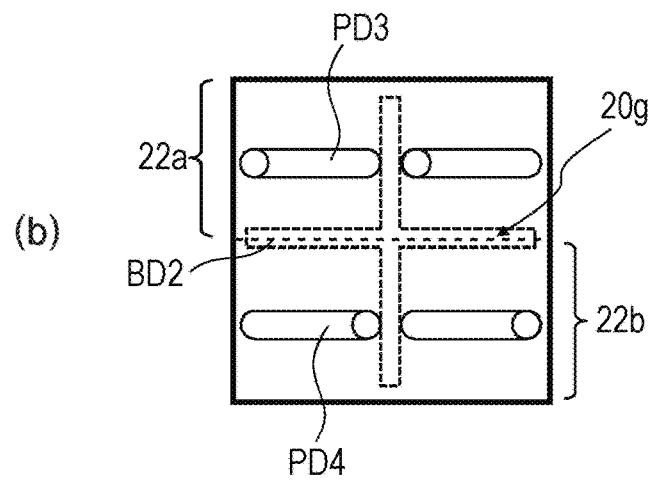
Figure 24:
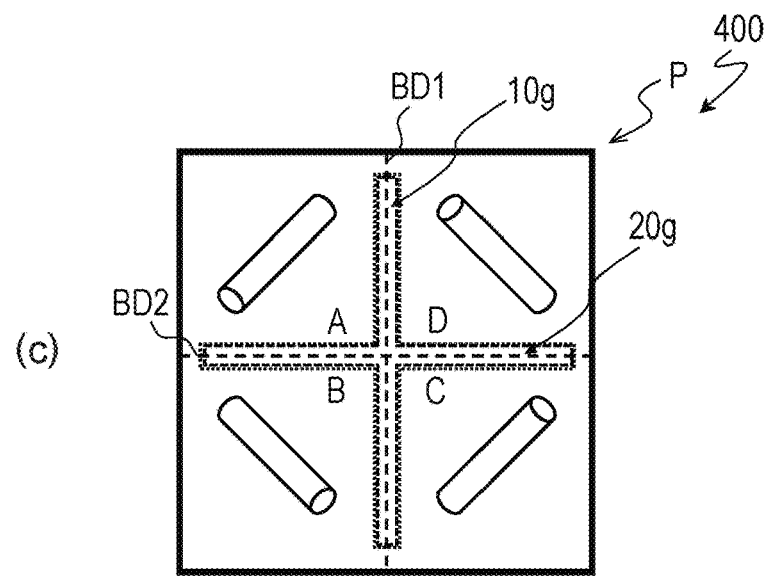

A liquid crystal display device 400 according to the present embodiment is described with reference to FIG. 24. FIG. 24(a) is a diagram showing the placement of a groove 10g formed in a surface of an active matrix substrate 10 of the liquid crystal display device 400, and FIG. 24(b) is a diagram showing the placement of a groove 20g formed in a surface of a counter substrate 20 of the liquid crystal display device 400. FIG. 24(c) is a diagram showing the placement of the grooves 10g and 20g in combination.

In the liquid crystal display device 400 according to the present embodiment, too, as shown in FIGS. 24(a), 24(b), and 24(c), the surface of the active matrix substrate 10 that faces the liquid crystal layer 30 has a groove 10g in each pixel P, and the surface of the counter substrate 20 that faces the liquid crystal layer 30 has a groove 20g in each pixel P.

As shown in FIGS. 24(a) and 24(c), the groove 10g on the side of the active matrix substrate 10 is formed so as to overlap both the first pretilt boundary BD1 and the second pretilt boundary BD2 when seen from the direction normal to the display surface. Accordingly, the groove 10g has a substantially cross shape.

As shown in FIGS. 24(b) and 24(c), the groove 20g on the side of the counter substrate 20 is formed so as to overlap both the first pretilt boundary BD1 and the second pretilt boundary BD2 when seen from the direction normal to the display surface. Accordingly, the groove 20g has a substantially cross shape.

With the grooves 10g and 20g thus placed, the liquid crystal display device 400 makes it possible to reduce the areas (widths) of the dark lines DL1 to DL4, as is the case with the liquid crystal display device 100 according to Embodiment 1 and the like.

Figure 25:
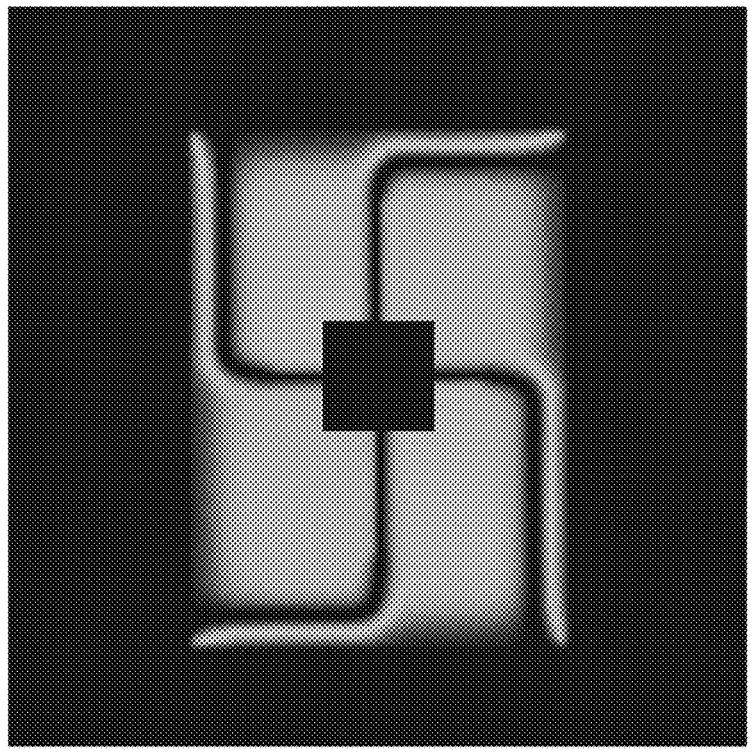
FIG. 25 illustrates diagrams (a) and (b) showing results each obtained from running a simulation of a distribution of transmittance within a pixel during a white display, the diagram (a) showing a result of a case (Example 1) where a groove 10g is formed only on the side of the active matrix substrate 10, the diagram (b) showing a result of a case (Example 2) where a groove 10g is formed on the side of the active matrix substrate 10 and a groove 20g is formed on the side of the counter substrate 20.
Figure 25:
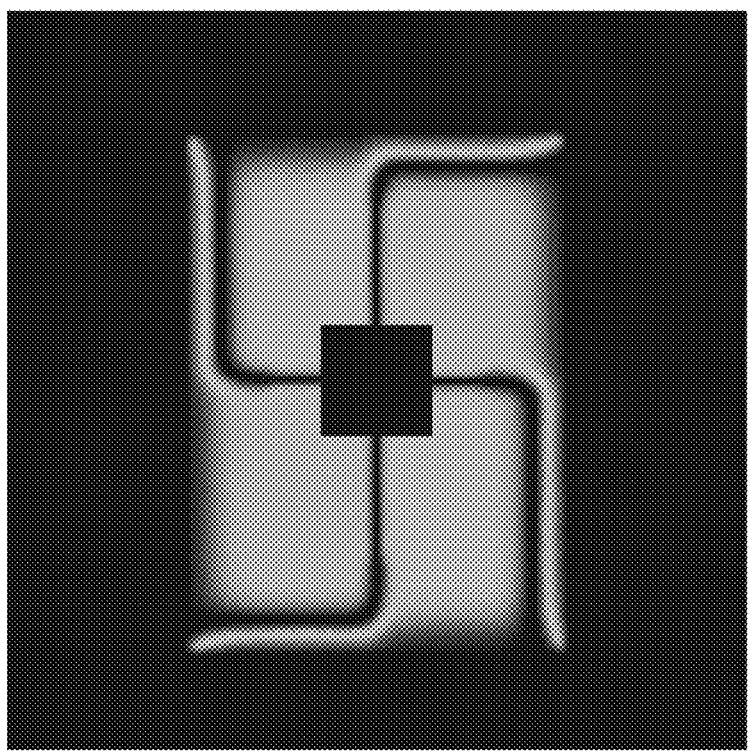

A result obtained from verifying an effect of improvement on transmittance (luminance) by grooves 10g and 20g is described here. FIGS. 25(a) and 25(b) show results each obtained from running a simulation of a distribution of transmittance within a pixel during a white display. FIG. 25(a) shows a result of a case (Example 1) where a substantially cross-shaped groove 10g is formed only on the side of the active matrix substrate 10, and FIG. 25(b) shows a result of a case (Example 2) where a substantially cross-shaped groove 10g is formed on the side of the active matrix substrate 10 and a substantially cross-shaped groove 20g is formed on the side of the counter substrate 20.

FIGS. 25(a) and 25(b) show that Example 2 too reduces the widths of the dark lines DL1 to DL4, which appear at the boundaries between liquid crystal domains, as is the case with Example 1.

Figure 26:
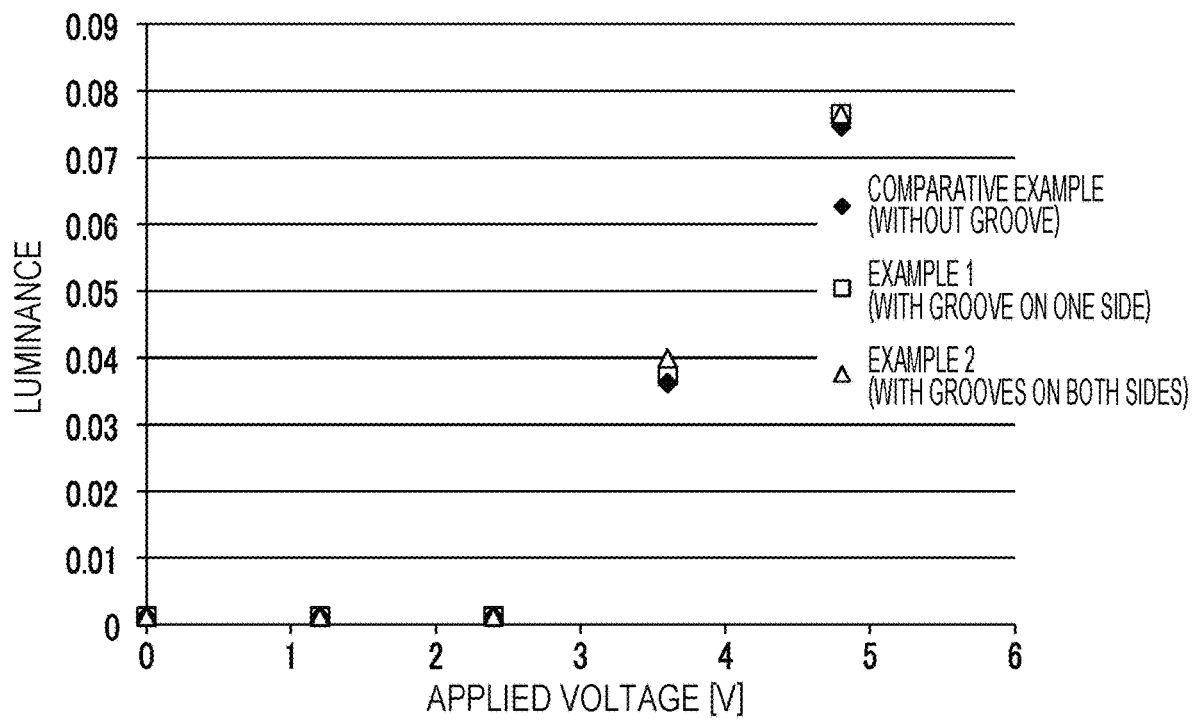
FIG. 26 is a graph showing relationships between applied voltage [V] and luminance in Examples 1 and 2 and Comparative Example.

Table 3 and FIG. 26 show relationships between applied voltage [V] and luminance in Examples 1 and 2 and Comparative Example.

TABLE 3

| | Luminance | | |
|---|---|---|---|
| Applied voltage [V] | Comparative Example (without groove) | Example 1 (with groove on one side) | Example 2 (with grooves on both sides) |
| 0 | 0.001197 | 0.001197 | 0.001197 |
| 1.2 | 0.001197 | 0.001197 | 0.001197 |
| 2.4 | 0.001222 | 0.001221 | 0.001221 |
| 3.6 | 0.036201 | 0.037332 | 0.039919 |
| 4.8 | 0.073841 | 0.076531 | 0.076546 |

Table 3 and FIG. 26 show that in a white display state (applied voltage: 4.8 V) and a high-level halftone display state (applied voltage: 3.6 V), Example 2 shows more improved luminance (transmittance) than Comparative Example. Further, Table 3 and FIG. 26 also show that in a black display state (applied voltage: 0 V) and a low-level halftone display state (applied voltage: 1.2 V, 2.4 V), Example 2 shows no leakage of light (decrease in contrast ratio). In the example verified here, Example 2 is slightly higher in luminance than Example 1 in both the white display state and the high-level halftone display state, but the difference was not that great. That is, it was found that a sufficient luminance-improving effect is brought about by providing a groove on the side of only one of the substrates.

Embodiment 5

Figure 27:
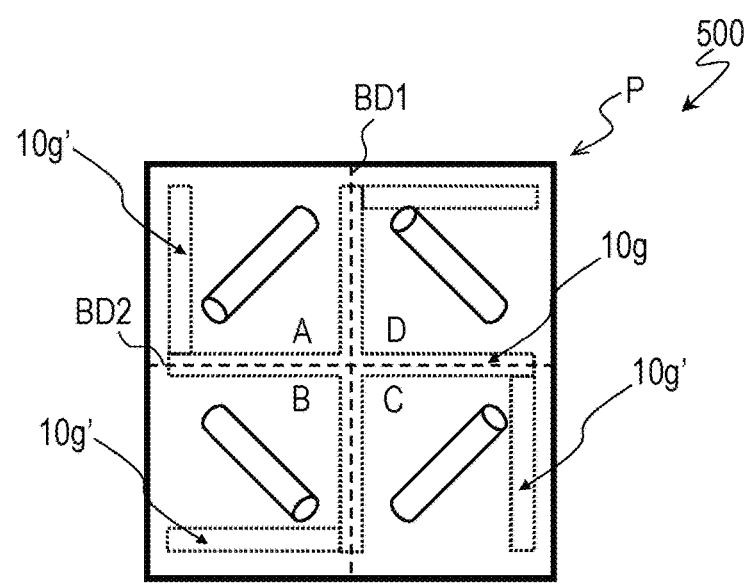
FIG. 27 is a plan view showing the placement of grooves 10g and 10g' within a pixel P of a liquid crystal display device 500 according to an embodiment of the present invention.

A liquid crystal display device 500 according to the present embodiment is described with reference to FIG. 27. FIG. 27 is a plan view showing the placement of grooves 10g and 10g' within a pixel P of the liquid crystal display device 500. The following mainly describes where the liquid crystal display device 500 is different from the liquid crystal display device 100 according to Embodiment 1.

The liquid crystal display device 500 according to the present embodiment differs from the liquid crystal display device 100 according to Embodiment 1 in that the surface of the active matrix substrate 10 that faces the liquid crystal layer 30 has further grooves 10g' in close proximity to edges of the pixel electrode 11. The following more specifically describes the placement of the grooves 10g' with additional reference to FIG. 28.

If an edge of the pixel electrode 11 located close to a liquid crystal domain has a portion (hereinafter called "edge portion") in which an azimuth direction orthogonal to the edge portion toward the inside of the pixel electrode 11 forms an angle of greater than 90 degrees with the tilt direction (reference alignment direction) of the liquid crystal domain, a dark line that is parallel to the edge portion is formed closer to the inside than the edge portion.

Figure 28:
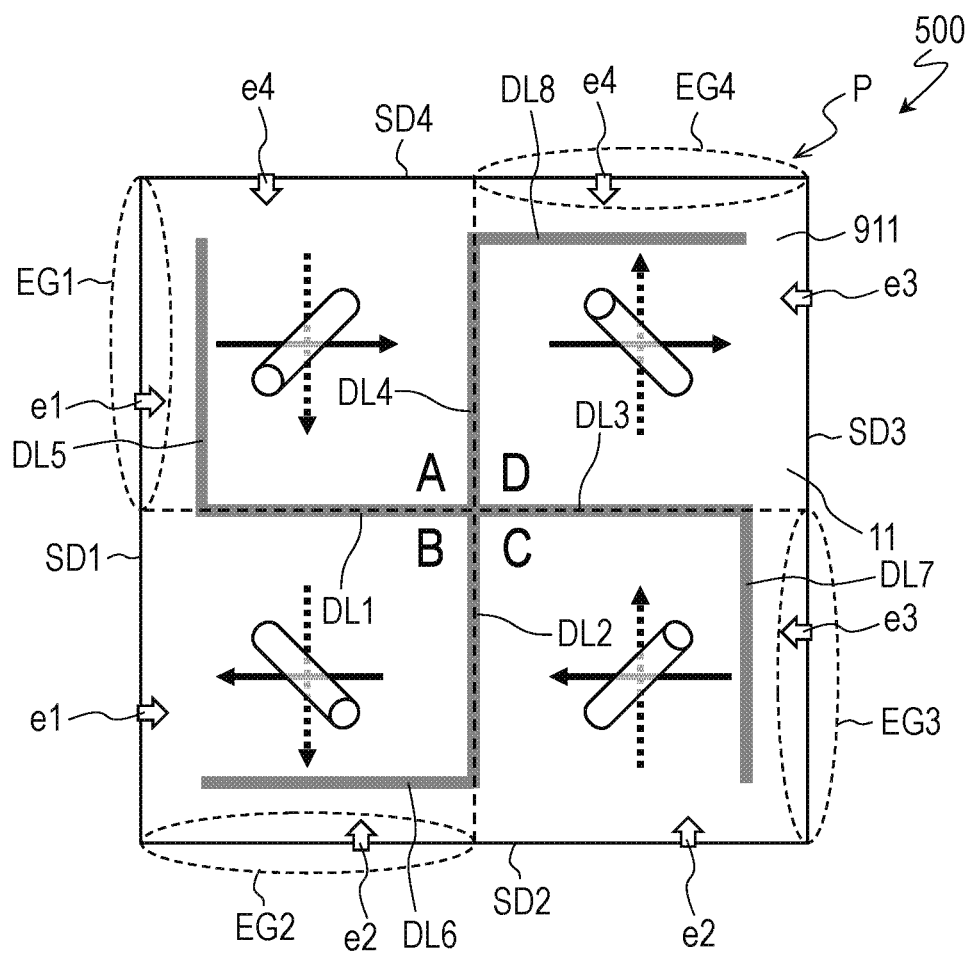
FIG. 28 is a diagram for explaining a reason why dark lines DL5 to DL8 appear within the pixel P of the liquid crystal display device 500.

As shown in FIG. 28, the pixel electrode 11 has four edges (sides) SD1, SD2, SD3, and SD4, and oblique electric fields that are generated at these edges SD1, SD2, SD3, and SD4 during the application of a voltage exert alignment-regulating forces having components of directions (azimuth direction) orthogonal to the respective edges toward the inside of the pixel electrode 11. In FIG. 28, the azimuth directions orthogonal to the edges SD1, SD2, SD3, and SD4 toward the inside of the pixel electrode 11 are indicated by arrows e1, e2, e3, and e4, respectively.

Each of the four liquid crystal domains A, B, C, and D is located close to two of the four edges SD1, SD2, SD3, and SD4 of the pixel electrode 11 and, during the application of a voltage, is subjected to alignment-regulating forces exerted by oblique electric fields generated at the two edges.

In an edge portion EG1 (upper half of the left edge SD1) of an edge of the pixel electrode 11 located close to the liquid crystal domain A, the azimuth direction e1 orthogonal to the edge portion EG1 toward the inside of the pixel electrode 11 forms an angle of greater than 90 degrees (specifically substantially 135 degrees) with the tilt direction t1 of the liquid crystal domain A. As a result, the dark line DL 5, which is parallel to the edge portion EG1, appears in the liquid crystal domain A during the application of a voltage.

Similarly, in an edge portion EG2 (left half of the lower edge SD2) of an edge of the pixel electrode 11 located close to the liquid crystal domain B, the azimuth direction e2 orthogonal to the edge portion EG2 toward the inside of the pixel electrode 11 forms an angle of greater than 90 degrees (specifically substantially 135 degrees) with the tilt direction t2 of the liquid crystal domain B. As a result, the dark line DL 6, which is parallel to the edge portion EG2, appears in the liquid crystal domain B during the application of a voltage.

Similarly, in an edge portion EG3 (lower half of the right edge SD3) of an edge of the pixel electrode 11 located close to the liquid crystal domain C, the azimuth direction e3 orthogonal to the edge portion EG3 toward the inside of the pixel electrode 11 forms an angle of greater than 90 degrees (specifically substantially 135 degrees) with the tilt direction t3 of the liquid crystal domain C. As a result, the dark line DL 7, which is parallel to the edge portion EG3, appears in the liquid crystal domain C during the application of a voltage.

Similarly, in an edge portion EG4 (right half of the upper edge SD4) of an edge of the pixel electrode 11 located close to the liquid crystal domain D, the azimuth direction e4 orthogonal to the edge portion EG4 toward the inside of the pixel electrode 11 forms an angle of greater than 90 degrees (specifically substantially 135 degrees) with the tilt direction t4 of the liquid crystal domain D. As a result, the dark line DL 8, which is parallel to the edge portion EG4, appears in the liquid crystal domain D during the application of a voltage.

The grooves 10g' are placed in close proximity to the edge portions EG1, EG2, EG3, and EG4, respectively. The grooves 10g' thus placed makes it possible to reduce the widths (areas) of the dark lines DL5 to DL8. The widths of the dark lines DL5 to DL8 can be reduced by the grooves 10g' for the same reason as the widths of the dark lines DL1 to DL4 can be reduced by the groove 10g.

In the present embodiment, the grooves 10g' are formed on the side of the active matrix substrate 10. Alternatively, grooves that are in close proximity to the edge portions EG1 to EG4 when seen from the direction normal to the display surface may be formed on the side of the counter substrate 20 (i.e. in the surface of the counter substrate 20 that faces the liquid crystal layer 30) (or on both the side of the active matrix substrate 10 and the side of the counter substrate 20).

Further, although FIG. 27 illustrates the grooves 10g' and the groove 10g in a continuous manner, the grooves 10g' may be separated from the groove 10g.

As mentioned above, the liquid crystal display devices 100 to 400 according to Embodiments 1 to 4 make it possible to reduce the areas of the dark lines DL1 to DL4, which appear at the boundaries between liquid crystal domains, and the liquid crystal display device 500 according to Embodiment 5 makes it possible to reduce the areas of the dark lines DL5 to DL8, which appear in the vicinity of the edge portions EG1 to EG4, respectively, of the pixel electrode 11, as well as the dark lines DL1 to DL4.

It should be noted that the applicant of the present application discloses, in Japanese Patent Application No. 2015-214796, a configuration in which a fine slit is formed in a portion of a pixel electrode located in the vicinity of a dark line. This configuration makes it possible to reduce the width of the dark line, as the fine slit causes a stronger alignment-regulating force to be exerted on liquid crystal molecules in the vicinity of the dark line.

However, in the configuration in which a fine slit is formed in a pixel electrode, variations in the finished quality of the fine slits destabilize the states of dark lines and may therefore cause a display quality loss such as unevenness. Further, because of a state of alignment in which luminance is low at a boundary between a region in a pixel electrode where a fine slit is formed and a region in the pixel electrode no fine slit is formed, the effect of improvement on transmittance may be low. Furthermore, the formation of a fine slit in a pixel electrode requires a photomask for use in patterning of the pixel electrode to include a fine slit pattern for forming the fine slit, thus undesirably making the price of the photomask higher.

On the other hand, the liquid crystal display devices 500 according to Embodiments 1 to 5 hardly destabilize the states of the dark lines DL1 to DL8 and therefore hardly suffer from a display quality loss such as unevenness. Further, the effect of improvement on transmittance is high. Furthermore, in a case where the mask for use in exposure of the organic insulating layer 8 is a gray-tone mask in the first place, a rise in the price of the mask is not invited.

(Another Arrangement of Liquid Crystal Domains)

The example shown in FIG. 4 and the like is not intended to limit the way in which one pixel P is divided by alignment into four liquid crystal domains A to D (i.e. the way in which the liquid crystal domains A to D are arranged within the pixel P).

Figure 29:
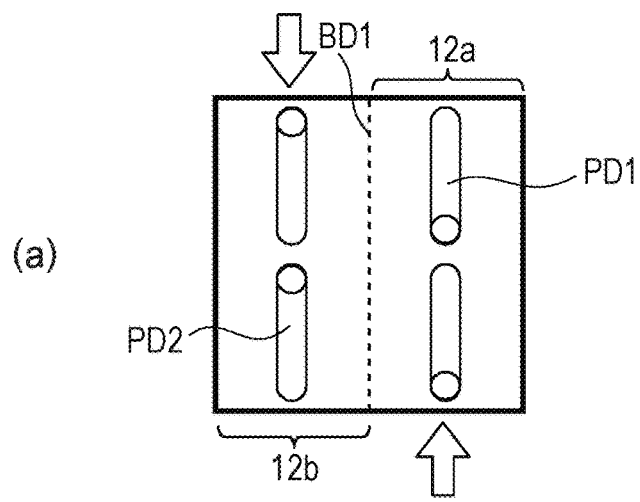
FIG. 29 illustrates diagrams (a), (b), and (c) for explaining a method for obtaining another example (pixel P1) of an aligned multi-domain structure.
Figure 29:
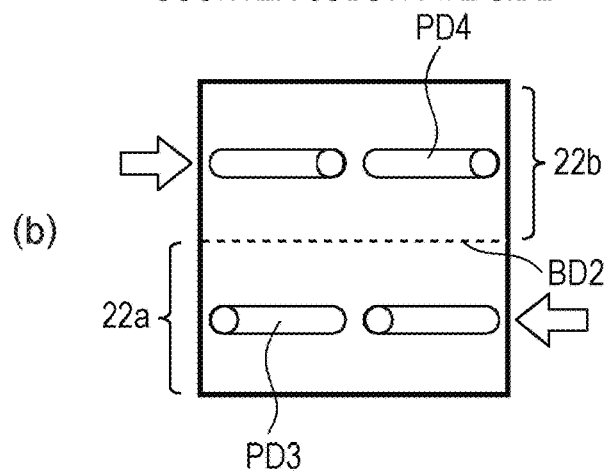
Figure 29:
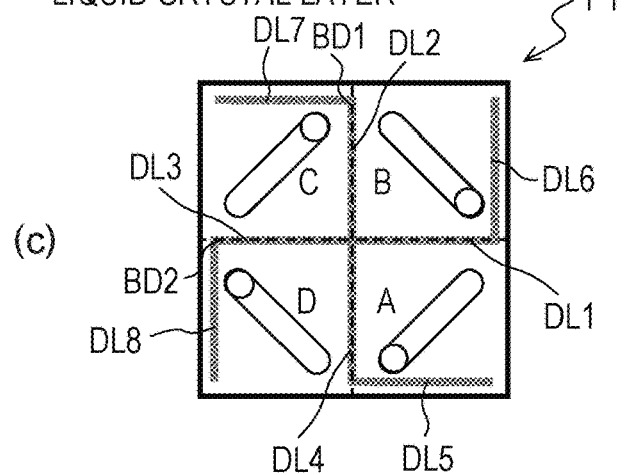

By bonding together an active matrix substrate 10 and a counter substrate 20 subjected to alignment treatment as shown in FIGS. 29(a) and 29(b), respectively, an aligned multi-domain pixel P1 can be formed as shown in FIG. 29(c). The pixel P1 has four liquid crystal domains A to D, as is the case with the pixel P. The tilt directions of the liquid crystal domains A to D are identical to those of the liquid crystal domains A to D of the pixel P, respectively.

Note, however, that while the liquid crystal domains A to D are arranged in the order of upper left, lower left, lower right, and then upper right (i.e. in a counterclockwise direction from the upper left) in the pixel P, the liquid crystal domains A to D are arranged in the order of lower right, upper right, upper left, and then lower left (i.e. in a counterclockwise direction from the lower right) in the pixel P1. This is because the pixel P and the pixel P1 are opposite in pretilt direction to each other in the right and left regions of the active matrix substrate 10 and the upper and lower regions of the counter substrate 20. Further, the dark lines DL5 and DL7, which appear in the liquid crystal domains A and C, respectively, are substantially parallel to the horizontal direction on the display surface, and the dark lines DL6 and DL8, which appear in the liquid crystal domains B and D, respectively, are substantially parallel to the vertical direction on the display surface. That is, the edge portion EG1 and the edge portion EG3 are substantially parallel to the horizontal direction, and the edge portion EG2 and the edge portion EG4 are substantially parallel to the vertical direction.

Figure 30:
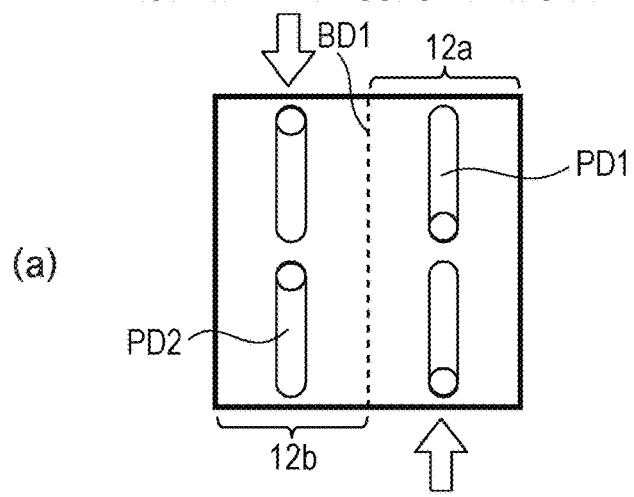
FIG. 30 illustrates diagrams (a), (b), and (c) for explaining a method for obtaining another example (pixel P2) of an aligned multi-domain structure.
Figure 30:
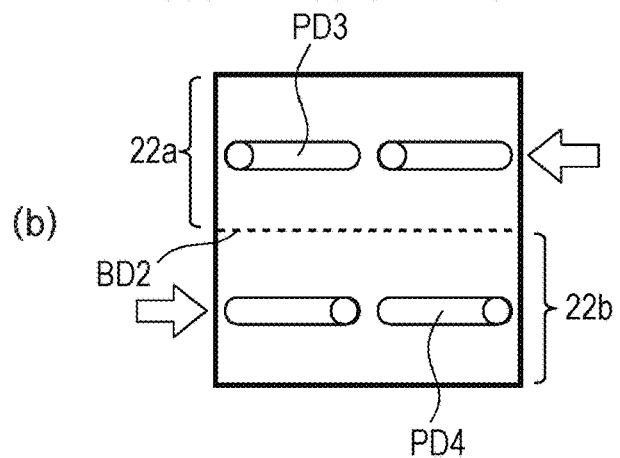
Figure 30:
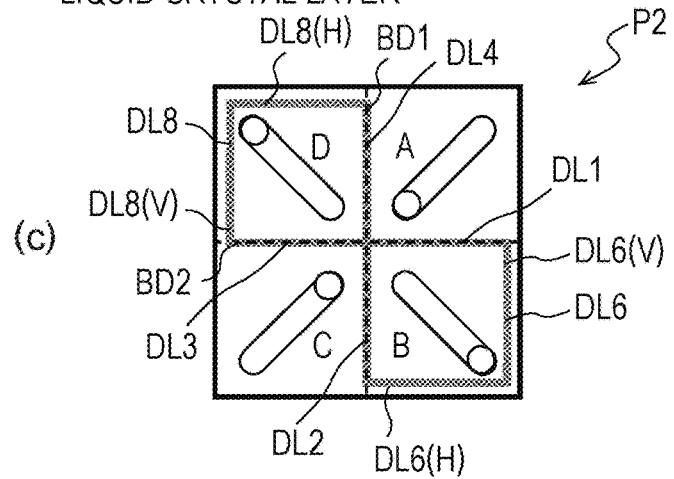

Further, by bonding together an active matrix substrate 10 and a counter substrate 20 subjected to alignment treatment as shown in FIGS. 30(a) and 30(b), respectively, an aligned multi-domain pixel P2 can be formed as shown in FIG. 30(c). The pixel P2 has four liquid crystal domains A to D, as is the case with the pixel P. The tilt directions of the liquid crystal domains A to D are identical to those of the liquid crystal domains A to D of the pixel P, respectively.

Note, however, that the liquid crystal domains A to D are arranged in the order of upper right, lower right, lower left, and then upper left (i.e. in a clockwise direction from the upper right) in the pixel P2. This is because the pixel P and the pixel P2 are opposite in pretilt direction to each other in the right and left regions of the active matrix substrate 10.

Further, no dark line appears in the liquid crystal domain A or C of the pixel P2. This is because neither of the edges of the pixel electrode 11 located close to the liquid crystal domains A and C, respectively, has an edge portion in which an azimuth direction orthogonal to the edge portion toward the inside of the pixel electrode 11 forms an angle of greater than 90 degrees with the tilt direction. Meanwhile, the dark lines DL6 and DL8 appear in the liquid crystal domains B and D, respectively. This is because each of the edges of the pixel electrode 11 located close to the liquid crystal domains B and D, respectively, has an edge portion in which an azimuth direction orthogonal to the edge portion toward the inside of the pixel electrode 11 forms an angle of greater than 90 degrees with the tilt direction. Further, the dark lines DL6 and DL8 include portions DL6(H) and DL8(H), respectively, that are parallel to the horizontal direction, and portions DL6(V) and DL8(V), respectively, that are parallel to the vertical direction. This is because the tilt direction of each of the liquid crystal domains B and D forms an angle of greater than 90 degrees with an azimuth direction orthogonal to an edge portion toward the inside of the pixel electrode 11, regardless of whether the edge portion is horizontal or vertical.

Figure 31:
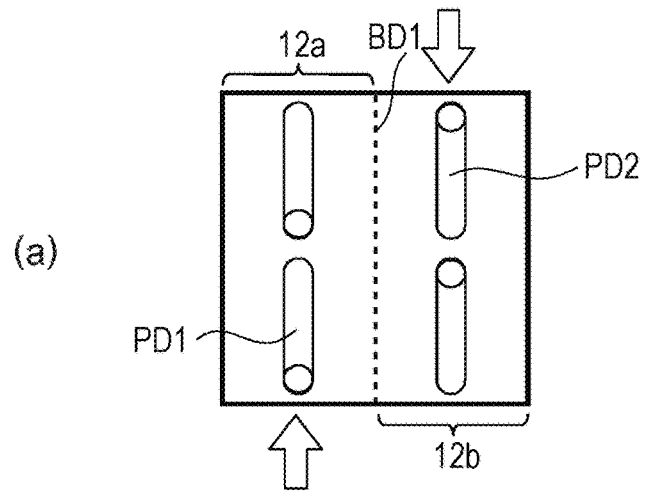
FIG. 31 illustrates diagrams (a), (b), and (c) for explaining a method for obtaining another example (pixel P3) of an aligned multi-domain structure.
Figure 31:
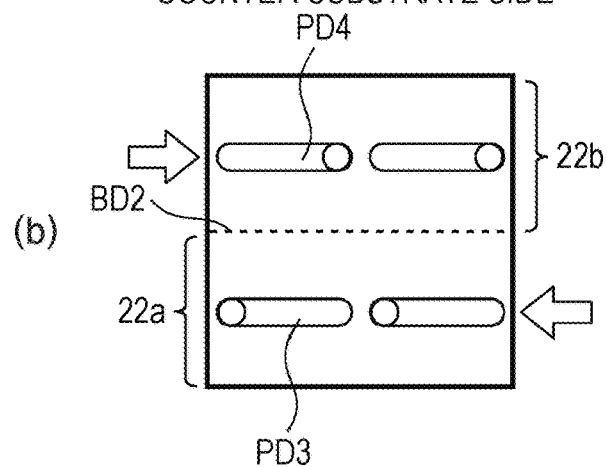
Figure 31:
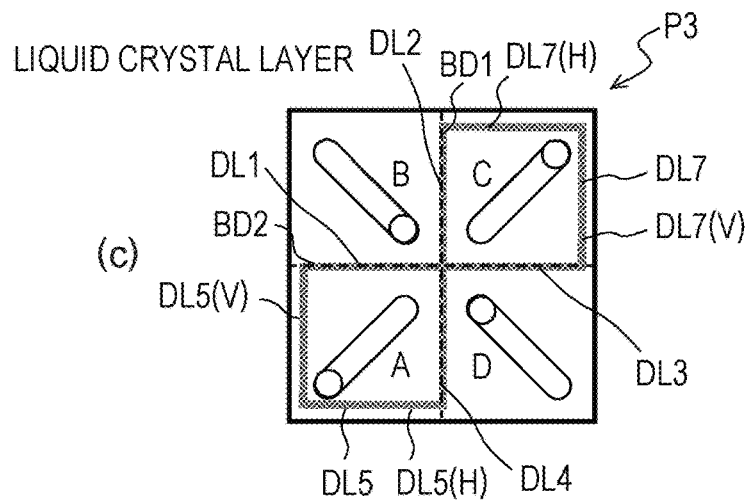

Further, by bonding together an active matrix substrate 10 and a counter substrate 20 subjected to alignment treatment as shown in FIGS. 31(a) and 31(b), respectively, an aligned multi-domain pixel P3 can be formed as shown in FIG. 31(c). The pixel P3 has four liquid crystal domains A to D, as is the case with the pixel P. The tilt directions of the liquid crystal domains A to D are identical to those of the liquid crystal domains A to D of the pixel P, respectively.

Note, however, that the liquid crystal domains A to D are arranged in the order of lower left, upper left, upper right, and then lower left (i.e. in a clockwise direction from the lower left) in the pixel P3. This is because the pixel P and the pixel P3 are opposite in pretilt direction to each other in the upper and lower regions of the counter substrate 20.

Further, no dark line appears in the liquid crystal domain B or D of the pixel P3. This is because neither of the edges of the pixel electrode 11 located close to the liquid crystal domains B and D, respectively, has an edge portion in which an azimuth direction orthogonal to the edge portion toward the inside of the pixel electrode 11 forms an angle of greater than 90 degrees with the tilt direction. Meanwhile, the dark lines DL5 and DL7 appear in the liquid crystal domains A and C, respectively. This is because each of the edges of the pixel electrode 11 located close to the liquid crystal domains A and C, respectively, has an edge portion in which an azimuth direction orthogonal to the edge portion toward the inside of the pixel electrode 11 forms an angle of greater than 90 degrees with the tilt direction. Further, the dark lines DL5 and DL7 include portions DL5(H) and DL7(H), respectively, that are parallel to the horizontal direction, and portions DL5(V) and DL7(V), respectively, that are parallel to the vertical direction. This is because the tilt direction of each of the liquid crystal domains A and C forms an angle of greater than 90 degrees with an azimuth direction orthogonal to an edge portion toward the inside of the pixel electrode 11, regardless of whether the edge portion is horizontal or vertical.

Although the foregoing description hitherto has illustrated a configuration in which the liquid crystal domains A to D are arranged in a matrix of two rows and two columns, this is not intended to limit the way in which the liquid crystal domains A to D are arranged. The liquid crystal domains A to D may be arranged in four rows and one column or in one row and four columns.

Figure 32:
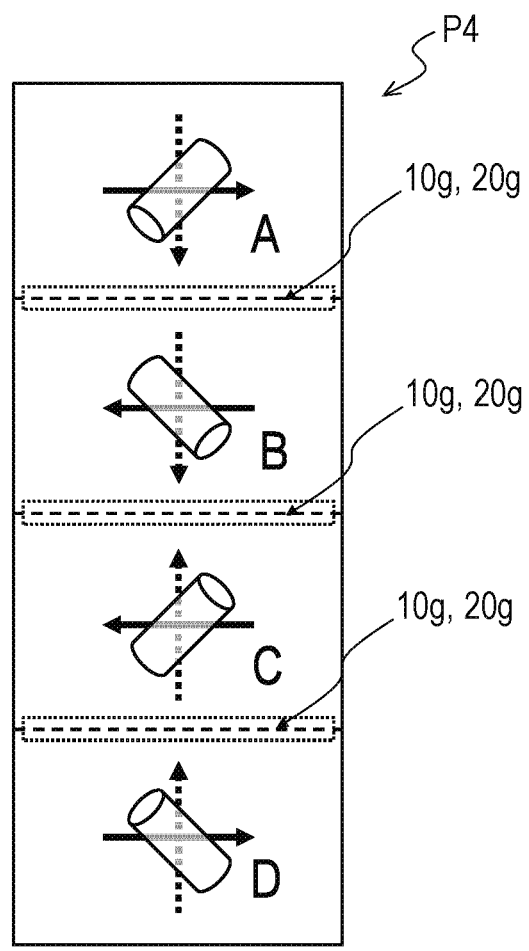
FIG. 32 is a diagram showing another example (pixel P4) of an aligned multi-domain structure.
Figure 33:
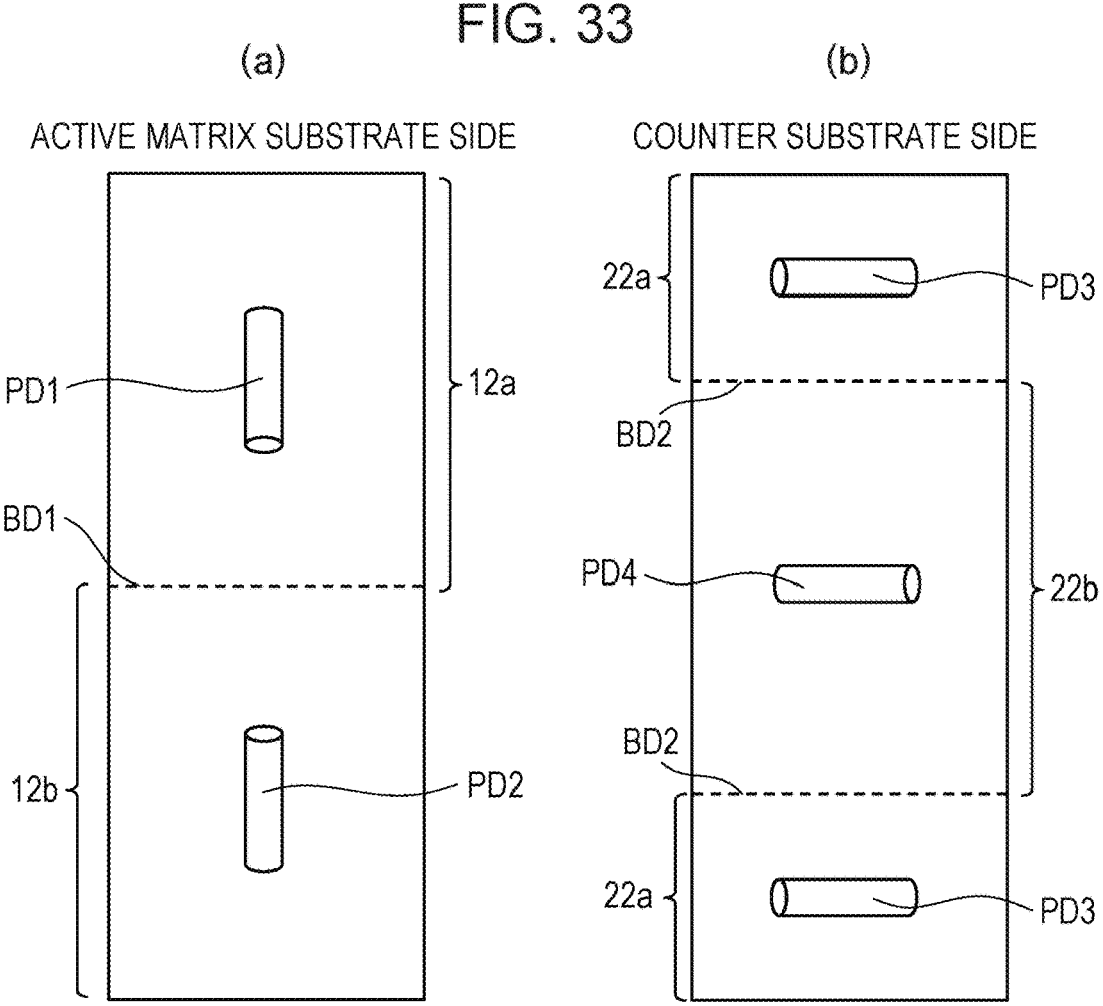
FIG. 33 illustrates diagrams (a) and (b) for explaining a method for obtaining the aligned multi-domain structure of the pixel P4 shown in FIG. 32.

FIG. 32 shows a pixel P4 whose liquid crystal domains A to D are arranged in four rows and one column. In the example shown in FIG. 32, the liquid crystal domains A to D are arranged in this order from the top within the pixel P4. The pixel P4 can be formed by bonding together an active matrix substrate 10 and a counter substrate 20 subjected to alignment treatment as shown in FIGS. 33(a) and 33(b), respectively.

As for the pixel P4 shown in FIG. 32, too, the width of a dark line that appears between adjacent liquid crystal domains can be reduced by forming, in the surface of the active matrix substrate 10 that faces the liquid crystal layer 30 and/or the surface of the counter substrate 20 that faces the liquid crystal layer 30, a groove(s) 10g and/or 20g that overlap(s) the pretilt boundary BD1 and the second pretilt boundary BD2.

INDUSTRIAL APPLICABILITY

An embodiment of the present invention makes it possible to reduce the area of a dark line that appears within a pixel of a VA mode liquid crystal display device having an alignment multi-domain structure formed by defining a pretilt direction with an alignment film.

REFERENCE SIGNS LIST

1 TFT (thin-film transistor)
2 Gate electrode
3 Gate insulating layer
4 Semiconductor layer
5 Source electrode
6 Drain electrode
6' Drain extension portion
7 Inorganic insulating layer
8 Organic insulating layer
8a Depressed portion
9 Auxiliary capacitor electrode
10 Active matrix substrate
10g Groove
10g' Groove
10a Substrate 11 Pixel electrode
12 First alignment film
12a First pretilt region
12b Second pretilt region
20 Counter substrate
20a Substrate
20g Groove
21 Counter electrode
22 Second alignment film
22a Third pretilt region
22b Fourth pretilt region
23 Color filter layer
24 Planarizing layer (overcoat layer)
24a Depressed portion
25a First color filter
25b Second color filter
25c Third color filter
26 Light-blocking layer (black matrix)
30 Liquid crystal layer
31 Liquid crystal molecule
41, 42 Polarizing plate
51 Slit
52 Fine slit
100, 200, 300, 400, 500 Liquid crystal display device
GL Gate line
SL Source line
CL Auxiliary capacitor line
CH Contact hole
P, P1, P2, P3, P4 Pixel
PA1, PA2 Polarizing axis
PD1 First pretilt direction
PD2 Second pretilt direction
PD3 Third pretilt direction
PD4 Fourth pretilt direction
BD1 First pretilt boundary
BD2 Second pretilt boundary
DL1, DL2, DL3, DL4, DL5, DL6, DL7, DL8 Dark line
EG1, EG2, EG3, EG4 Edge portion

The invention claimed is:

1. A liquid crystal display device comprising:
an arrangement of a first substrate and a second substrate that are opposed to each other;
a vertically-aligned liquid crystal layer provided between the first substrate and the second substrate; and
a plurality of pixels arranged in a matrix,
wherein the first substrate includes a pixel electrode provided in each of the plurality of pixels and a first alignment film provided between the pixel electrode and the liquid crystal layer,
the second substrate includes a counter electrode opposed to the pixel electrode and a second alignment film provided between the counter electrode and the liquid crystal layer,
the first alignment film has, within each of the plurality of pixels, a first pretilt region that defines a first pretilt direction and a second pretilt region that defines a second pretilt direction that is antiparallel to the first pretilt direction,
the second alignment film has, within each of the plurality of pixels, a third pretilt region that defines a third pretilt direction that is substantially orthogonal to the first pretilt direction and the second pretilt direction and a fourth pretilt region that defines a fourth pretilt direction that is antiparallel to the third pretilt direction,
at least one of a surface of the first substrate that faces the liquid crystal layer and a surface of the second substrate that faces the liquid crystal layer has a groove formed so as to overlap at least one of a boundary between the first pretilt region and the second pretilt region and a boundary between the third pretilt region and the fourth pretilt region when viewed from a direction normal to a display surface,
at least the surface of the first substrate has the groove, the pixel electrode is formed so as to overlap the groove in the surface of the first substrate when viewed from the direction normal to the display surface, and
the groove in the surface of the first substrate has a substantially cross shape.

2. The liquid crystal display device according to claim 1, wherein the first substrate further includes an organic insulating layer formed under the pixel electrode, and
the organic insulating layer has a depressed portion that defines the groove in the surface of the first substrate.

3. The liquid crystal display device according to claim 1, wherein the groove in the surface of the first substrate is formed so as to overlap both the boundary between the first pretilt region and the second pretilt region and the boundary between the third pretilt region and the fourth pretilt region when viewed from the direction normal to the display surface.

4. The liquid crystal display device according to claim 1, wherein each of the plurality of pixels has a first liquid crystal domain in which a tilt direction of liquid crystal molecules near a center of the liquid crystal layer in in-plane and thickness directions in presence of a voltage applied between the pixel electrode and the counter electrode is a predetermined first direction, a second liquid crystal domain in which a tilt direction of liquid crystal molecules near the center of the liquid crystal layer in the in-plane and thickness directions in the presence of a voltage applied between the pixel electrode and the counter electrode is a second direction, a third liquid crystal domain in which a tilt direction of liquid crystal molecules near the center of the liquid crystal layer in the in-plane and thickness directions in the presence of a voltage applied between the pixel electrode and the counter electrode is a third direction, and a fourth liquid crystal domain in which a tilt direction of liquid crystal molecules near the center of the liquid crystal layer in the in-plane and thickness directions in the presence of a voltage applied between the pixel electrode and the counter electrode is a fourth direction, and
the first direction, the second direction, the third direction, and the fourth direction are four directions any two of which have a difference therebetween that is substantially equal to an integral multiple of 90 degrees.

5. The liquid crystal display device according to claim 4, wherein the first liquid crystal domain is located close to at least a part of an edge of the pixel electrode, the at least a part including a first edge portion in which an azimuth direction orthogonal to the first edge portion toward an inside of the pixel electrode forms an angle of greater than 90 degrees with the first direction,
the second liquid crystal domain is located close to at least a part of an edge of the pixel electrode, the at least a part including a second edge portion in which an azimuth direction orthogonal to the second edge portion toward the inside of the pixel electrode forms an angle of greater than 90 degrees with the second direction,
the third liquid crystal domain is located close to at least a part of an edge of the pixel electrode, the at least a part including a third edge portion in which an azimuth direction orthogonal to the third edge portion toward the inside of the pixel electrode forms an angle of greater than 90 degrees with the third direction, the fourth liquid crystal domain is located close to at least a part of an edge of the pixel electrode, the at least a part including a fourth edge portion in which an azimuth direction orthogonal to the fourth edge portion toward the inside of the pixel electrode forms an angle of greater than 90 degrees with the fourth direction, and at least one of the surface of the first substrate and the surface of the second substrate further includes grooves in close proximity to the first edge portion, the second edge portion, the third edge portion, and the fourth edge portion.

6. The liquid crystal display device according to claim 4, wherein the first liquid crystal domain, the second liquid crystal domain, the third liquid crystal domain, and the fourth liquid crystal domain are each adjacent to another liquid crystal domain and are arranged in a matrix of two rows and two columns.

7. The liquid crystal display device according to claim 1, wherein the liquid crystal layer contains liquid crystal molecules having negative dielectric anisotropy.

8. The liquid crystal display device according to claim 1, wherein the first alignment film and the second alignment film are each a photo-alignment film.

9. A liquid crystal display device comprising:
an arrangement of a first substrate and a second substrate that are opposed to each other;
a vertically-aligned liquid crystal layer provided between the first substrate and the second substrate; and
a plurality of pixels arranged in a matrix,
wherein the first substrate includes a pixel electrode provided in each of the plurality of pixels and a first alignment film provided between the pixel electrode and the liquid crystal layer,
the second substrate includes a counter electrode opposed to the pixel electrode and a second alignment film provided between the counter electrode and the liquid crystal layer,
the first alignment film has, within each of the plurality of pixels, a first pretilt region that defines a first pretilt direction and a second pretilt region that defines a second pretilt direction that is antiparallel to the first pretilt direction,
the second alignment film has, within each of the plurality of pixels, a third pretilt region that defines a third pretilt direction that is substantially orthogonal to the first pretilt direction and the second pretilt direction and a fourth pretilt region that defines a fourth pretilt direction that is antiparallel to the third pretilt direction,
at least one of a surface of the first substrate that faces the liquid crystal layer and a surface of the second substrate that faces the liquid crystal layer has a groove formed so as to overlap at least one of a boundary between the first pretilt region and the second pretilt region and a boundary between the third pretilt region and the fourth pretilt region when viewed from a direction normal to a display surface,
the surface of the first substrate and the surface of the second substrate each have the groove,
the pixel electrode is formed so as to overlap the groove in the surface of the first substrate when viewed from the direction normal to the display surface,
the groove in the surface of the first substrate has a substantially cross shape,
the counter electrode is formed so as to overlap the groove in the surface of the second substrate when viewed from the direction normal to the display surface, and the groove in the surface of the second substrate has a substantially cross shape.

10. The liquid crystal display device according to claim 9, wherein the first substrate further includes an organic insulating layer formed under the pixel electrode, and
the organic insulating layer has a depressed portion that defines the groove in the surface of the first substrate,
the second substrate further includes a color filter layer and a planarizing layer covering the color filter layer,
the counter electrode is provided over the planarizing layer, and
the planarizing layer has a depressed portion that defines the groove in the surface of the second substrate.

11. The liquid crystal display device according to claim 9, wherein the groove in the surface of the first substrate is formed so as to overlap both the boundary between the first pretilt region and the second pretilt region and the boundary between the third pretilt region and the fourth pretilt region when viewed from the direction normal to the display surface, and
the groove in the surface of the second substrate is formed so as to overlap both the boundary between the first pretilt region and the second pretilt region and the boundary between the third pretilt region and the fourth pretilt region when viewed from the direction normal to the display surface.

12. The liquid crystal display device according to claim 9, wherein the groove in the surface of the first substrate is formed so as to overlap the boundary between the first pretilt region and the second pretilt region when viewed from the direction normal to the display surface, and
the groove in the surface of the second substrate is formed so as to overlap the boundary between the third pretilt region and the fourth pretilt region when viewed from the direction normal to the display surface.

13. The liquid crystal display device according to claim 9, wherein each of the plurality of pixels has a first liquid crystal domain in which a tilt direction of liquid crystal molecules near a center of the liquid crystal layer in in-plane and thickness directions in presence of a voltage applied between the pixel electrode and the counter electrode is a predetermined first direction, a second liquid crystal domain in which a tilt direction of liquid crystal molecules near the center of the liquid crystal layer in the in-plane and thickness directions in the presence of a voltage applied between the pixel electrode and the counter electrode is a second direction, a third liquid crystal domain in which a tilt direction of liquid crystal molecules near the center of the liquid crystal layer in the in-plane and thickness directions in the presence of a voltage applied between the pixel electrode and the counter electrode is a third direction, and a fourth liquid crystal domain in which a tilt direction of liquid crystal molecules near the center of the liquid crystal layer in the in-plane and thickness directions in the presence of a voltage applied between the pixel electrode and the counter electrode is a fourth direction, and
the first direction, the second direction, the third direction, and the fourth direction are four directions any two of which have a difference therebetween that is substantially equal to an integral multiple of 90 degrees.

14. The liquid crystal display device according to claim 13, wherein the first liquid crystal domain is located close to at least a part of an edge of the pixel electrode, the at least a part including a first edge portion in which an azimuth direction orthogonal to the first edge portion toward an inside of the pixel electrode forms an angle of greater than 90 degrees with the first direction, the second liquid crystal domain is located close to at least a part of an edge of the pixel electrode, the at least a part including a second edge portion in which an azimuth direction orthogonal to the second edge portion toward the inside of the pixel electrode forms an angle of greater than 90 degrees with the second direction, the third liquid crystal domain is located close to at least a part of an edge of the pixel electrode, the at least a part including a third edge portion in which an azimuth direction orthogonal to the third edge portion toward the inside of the pixel electrode forms an angle of greater than 90 degrees with the third direction, the fourth liquid crystal domain is located close to at least a part of an edge of the pixel electrode, the at least a part including a fourth edge portion in which an azimuth direction orthogonal to the fourth edge portion toward the inside of the pixel electrode forms an angle of greater than 90 degrees with the fourth direction, and at least one of the surface of the first substrate and the surface of the second substrate has further grooves in close proximity to the first edge portion, the second edge portion, the third edge portion, and the fourth edge portion.

15. The liquid crystal display device according to claim 13, wherein the first liquid crystal domain, the second liquid crystal domain, the third liquid crystal domain, and the fourth liquid crystal domain are each adjacent to another liquid crystal domain and are arranged in a matrix of two rows and two columns.

16. The liquid crystal display device according to claim 9, wherein the liquid crystal layer contains liquid crystal molecules having negative dielectric anisotropy.

17. The liquid crystal display device according to claim 9, wherein the first alignment film and the second alignment film are each a photo-alignment film.

\* \* \* \* \*